(12) United States Patent
Soga et al.

(10) Patent No.: US 6,787,617 B1
(45) Date of Patent: Sep. 7, 2004

(54) PROCESS FOR PRODUCING OLEFIN LIVING POLYMER

(75) Inventors: Kazuo Soga, deceased, late of Tsukuba (JP); by Hisae Soga, legal representative, Ichihara (JP); Takeshi Shiono, Yokohama (JP); Michihiko Asai, Tsukuba (JP); Yasuzo Suzuki, Tsukuba (JP); Akira Miyazawa, Tsukuba (JP); Kenji Tsuchihara, Tsukuba (JP); Masahide Murata, Tokyo (JP); Hiroyuki Ozaki, Yokohama (JP); Masanao Kawabe, Kitakyushu (JP); Toshio Kase, Yokosuka (JP); Jizhu Jin, Kanazawa (JP); Hideaki Hagiwara, Tsukuba (JP); Yoshifumi Fukui, Toyonaka (JP)

(73) Assignees: Japan as represented by Director General of the Agency of Industrial Science and Technology, Tokyo (JP); Japan Chemical Innovation Institute, Tokyo (JP)

( * ) Notice: Subject to any disclaimer, the term of this patent is extended or adjusted under 35 U.S.C. 154(b) by 0 days.

(21) Appl. No.: 10/009,094

(22) PCT Filed: May 2, 2000

(86) PCT No.: PCT/JP00/02891

§ 371 (c)(1),
(2), (4) Date: Nov. 8, 2001

(87) PCT Pub. No.: WO00/68276

PCT Pub. Date: Nov. 16, 2000

(30) Foreign Application Priority Data

May 10, 1999 (JP) .......................... 11-128732
Sep. 16, 1999 (JP) .......................... 11-261950
Sep. 16, 1999 (JP) .......................... 11-261952

(51) Int. Cl.$^7$ ................................. C08F 4/52
(52) U.S. Cl. .................. 526/153; 526/134; 526/160; 526/170; 526/943; 526/348.2; 526/348.6; 526/348.8; 526/351; 526/352
(58) Field of Search ................. 526/153, 160, 526/170, 943

(56) References Cited

U.S. PATENT DOCUMENTS 5,391,629 A * 2/1995 Turner et al. ............... 525/268
6,300,438 B1 * 10/2001 McConville ................ 526/161

FOREIGN PATENT DOCUMENTS

| EP | 0426637 | 5/1991 | .................... 4/603 |
| EP | 0427697 | 5/1991 | .................... 4/602 |
| JP | 2001-81123 A | * 3/2001 | .......... C08F/4/642 |
| WO | 9112285 | 8/1991 | .................... 297/8 |
| WO | 9114713 | 10/1991 | .................... 4/646 |
| WO | 9421700 | 9/1994 | .................... 297/8 |
| WO | 9529940 | 11/1995 | |
| WO | 9940133 | 8/1999 | ...................... 36/6 |

OTHER PUBLICATIONS

J. Am. Chem. Soc. 188, 10008 (1996) Copy to follow.
J. Am. Chem. Soc. 119, 3830 (1997) Copy to follow.
Macromolecules, 12, 814 (1979). Copy to follow.
Macromolecules, 31, 3184 (1998) Copy to follow.
Poly. prepr., Japan, 46, 1601 (1997) Copy to follow.
Shokubai, 37 205 (1995) Copy to follow.
Killian, Christopher M., Tempel, Daniel J., Johnson, Lynda K., Brookhart, Maurice; "Living Polymerization of α–Olefins Using $Ni^{II}$–α–Dimine Catalyst. Synthesis of New Block Polymers Based on α–Olefins"; J. Am. Chem. Soc. 1996, 118, 11664–11665.
Kohara, Tadano; Syntheses and Applications of Terminally Functionalized Polyolefins; Kobunshi, Feb. 1998, vol. 47, 74–77.

* cited by examiner

Primary Examiner—David W. Wu
Assistant Examiner—Rip A. Lee

(57) ABSTRACT

A process for preparing olefinic living polymers having a molecular weight distribution (Mw/Mn) of 1 to 1.3, comprising polymerizing an olefinic monomer having 2 to 20 carbon atoms at low temperatures in the presence of a catalyst comprising (A) a hafnium or zirconium-containing compound having one or two cyclopentadienyl backbones, (B) a triphenyl boron compound or a tetraphenyl borate compound and optionally (C) a specific mono-, di- or trialkylaluminum compound. When the catalyst comprising the zirconium-containing compound is prepared by further using a titanium-containing compound (D), the polymerization temperature can be raised.

20 Claims, 9 Drawing Sheets

PROCESS FOR PRODUCING OLEFIN LIVING POLYMER

TECHNICAL FIELD

The present invention relates to a process for preparing olefinic living polymers, and more particularly to a process for preparing olefinic living polymers which can be converted into terminal-functionalized polymers and block copolymers having a narrow molecular weight distribution.

BACKGROUND ART

Regarding living polymerization of olefins, there are reported production of syndiotactic polypropylene (PP) ([r] not more than 0.8) having a molecular weight distribution (Mw/Mn) of 1.05 to 1.4 using V(acac)$_3$/R$_2$AlX catalyst, wherein acac is acetylacetonato, R is ethyl or isobutyl group and X is Cl or Br, in Macromolecules, 12, 814(1979); production of living polymers of ethylene or 1-hexene using Me$_2$Si(2-SiMe$_3$-4-tBu-C$_5$H$_2$)$_2$Sm(THF)$_2$ catalyst.without cocatalyst, wherein Me is methyl group, tBu is t-butyl group and THF is tetrahydrofuran, in Shokubai, 37, 205(1995); production of living polymers of C$_6$ to C$_{10}$ α-olefins having a Mw/Mn ratio of not more than 1.1 at room temperature using [(2,6-iPr$_2$C$_6$H$_3$)N(CH$_2$)$_3$N(2,6-iPr$_2$C$_6$H$_3$)]TiMe$_2$/B (C$_6$F$_5$)$_3$ catalyst, wherein iPr is isopropyl group and Me is methyl group, in J. Am. Chem. Soc., 118, 10008(1996); living polymerization of α-olefins having 3 to 18 carbon atoms in a low concentration at a temperature of not more than 0° C. in the presence of a catalyst system consisting of a bulky aryl group-containing diimine complex of Ni represented by the formula:

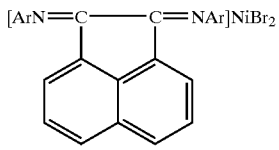

wherein Ar is 2,6-diisopropylphenyl group, in J. Am. Chem. Soc., 118, 11664(1996); production of atactic living polymer of 1-hexene having a Mw/Mn ratio of not more than 1.1 at 0° C. using a catalyst consisting of a tri-coordination type diamide complex of Zr ([NON]ZrMe$_2$ complex) and B(C$_6$F$_5$)$_3$ wherein [NON]ZrMe$_2$ complex is a compound of the formula:

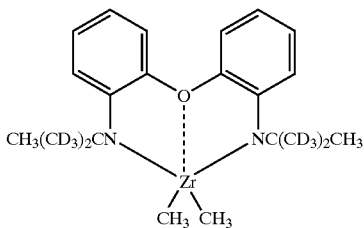

in J. Am. Chem. Soc., 119, 3830(1997); and production of syndiotactic living polypropylene of [r] about 0.65 at low temperatures using [tBuNSiMe$_2$Flu]TiMe$_2$/B(C$_6$F$_5$)$_3$ catalyst, wherein tBu is t-butyl group, Me is methyl group and Flu is

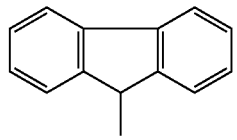

in Polym. Prepr., Japan, 46, 1601(1997); cf. Kobunshi, Vol. 47, February, 74–77(1998).

Also, JP-A-5-503546 discloses production of a multi-block copolymer having a molecular weight distribution of 1.4 to 1.8 by bringing a first olefin component into contact with a catalyst which is a reaction product of a metallocene component such as a bis(cyclopentadienyl)titanium, zirconium or hafnium derivative (first component) with a second component having a cation capable of donating a proton and a compatible non-coordinating anion, at a temperature of −5 to +10° C. to produce a first living polymer and then adding a second monomer to copolymerize with the first polymer.

Further, JP-A-9-500150 discloses production of a block copolymer or tapered copolymer having a molecular weight distribution of 1.35 to 4.1 by copolymerizing at least one olefinic monomer at a temperature of −5 to +10° C. using a catalyst which is a reaction product of a cyclopentadienyl Group IV-B metal component with an alumoxane or a compatible non-coordinating anion wherein Ti, Zr and Hf are exemplified as the Group IV-B metal.

On the other hand, it is reported in Macromelecules, 31, 3184(1998) that living polymerization of propylene or 1-hexene takes place at −50° C. in the presence of [tBuNSiMe$_2$Flu]TiMe$_2$ catalyst.

For example, however, in case of using the [(2,6-iPr$_2$C$_6$H$_3$)N(CH$_2$)$_3$N(2,6-iPr$_2$C$_6$H$_3$)]TiMe$_2$/B(C$_6$F$_5$)$_3$ catalsyt or the bulky aryl group-containing diimine Ni complex/ methylaluminoxane catalyst mentioned above, problems are encountered that these catalysts are complicated and are hard to prepare and the obtained polymers are poor in regularity. The production of syndiotactic living polymers at low temperatures using the above-mentioned [tBuNSiMe$_2$Flu]TiMe$_2$/B(C$_6$F$_5$)$_3$ catalyst has also the problems that syndiotactic polymers having a low stereoregularity are only obtained, and polymers having a high stereoregularity such as high syndiotacticity or high isotacticity, polymers rich in isotacticity or atactic polymers cannot be obtained, and that the structure of the catalyst is complicated and it is hard to prepare the catalyst.

Also, in case of using as a catalyst the reaction product of a metallocene component and a second component having a cation capable of donating a proton and a compatible non-coordinating anion, and in case of using as a catalyst a reaction product of a cyclopentadienyl Group IV-B metal component with an alumoxane or a compatible non-coordinating anion, it is not always possible to make the molecular weight distribution narrow or it is not always possible to efficiently obtain living polymers. In the field of using terminal-functionalized polymers or block copolymers, it has been desired to produce living polymers having a narrower molecular weight distribution or to more efficiently produce living polymers, from the viewpoint that polymers having a high rate of terminal functionalization or a high blocking efficiency.

Further, the living polymerization at −50° C. using [tBuNSiMe$_2$Flu]TiMe$_2$ catalyst is not satisfactory in yield and molecular weight of the produced polymers.

DISCLOSURE OF INVENTION

The present inventors have found, as a result of making intensive study in order to solve the above problems of the prior art, that olefinic living polymers having a molecular weight distribution of not more than 1.3 can be prepared when olefinic monomers are polymerized at low temperatures using a catalyst comprising a hafnium or zirconium-containing compound having one or two cyclopentadienyl backbones, a borane or borate compound having a phenyl group which may be substituted, and optionally a specific alkylaluminum compound.

Thus, in accordance with an embodiment of the present invention, there is provided a process for preparing olefinic living polymers which comprises polymerizing an olefinic monomer having 2 to 20 carbon atoms at a polymerization temperature of −20 to −100° C. in the presence of a catalyst comprising:

(A-1) a hafnium-containing compound having one or two cyclopentadienyl backbones, and (B) a borane compound (B-1) of the formula (I):

$$B(Ph)_3 \qquad (I)$$

wherein Ph is a phenyl group which may be substituted, or a borate compound (B-2) of the formula (II):

$$B^-(Ph)_4 X^+ \qquad (II)$$

wherein Ph is as defined above and $X^+$ is a cation, to produce a polymer having a molecular weight distribution (Mw/Mn) of 1 to 1.3.

Further, in accordance with another embodiment of the present invention, there is provided a process for preparing olefinic living polymers which comprises polymerizing an olefinic monomer having 2 to 20 carbon atoms, at a polymerization temperature of −60 to −100° C. in the presence of a catalyst comprising:

(A-2) a zirconium-containing compound having one or two cyclopentadienyl backbones, and (B) a borane compound (B-1) of the formula (I):

$$B(Ph)_3 \qquad (I)$$

wherein Ph is a phenyl group which may be substituted, or a borate compound (B-2) of the formula (II):

$$B^-(Ph)_4 X^+ \qquad (II)$$

wherein Ph is as defined above and $X^+$ is a cation, to produce a polymer having a molecular weight distribution (Mw/Mn) of 1 to 1.3.

In the preparation of the catalyst, the hafnium-containing compound (A-1) and the zirconium-containing compound (A-2) may be used together. In this case, there is the case that living polymers having a bimodal molecular weight distribution are obtained.

The above-mentioned catalysts can be prepared by using the components (A) and (B) together with an aluminum compound (C) of the formula (III):

$$AlR_{3-n}Y_n \qquad (III)$$

wherein R is a hydrocarbon group having 4 to 20 carbon atoms, Y is a halogen atom, an alkoxyl group, a trialkylsiloxy group, a di(trialkylsilyl)amino group or a trialkylsilyl group, and n is 0, 1 or 2. The aluminum compound (C) serves as a so-called scavenger (agent for scavenging impurities), and catalysts comprising the components (A) to (C) stably produce living polymers even in polymerization systems containing impurities.

Thus, in accordance with still another embodiment of the present invention, there is provided a process for preparing olefinic living polymers which comprises polymerizing an olefinic monomer having 2 to 20 carbon atoms in the presence of a catalyst comprising:

(A) a hafnium or zirconium-containing compound having one or two cyclopentadienyl backbones, (B) a borane compound (B-1) of the formula (I):

$$B(Ph)_3 \qquad (I)$$

wherein Ph is a phenyl group which may be substituted, or a borate compound (B-2) of the formula (II):

$$B^-(Ph)_4 X^+ \qquad (II)$$

wherein Ph is as defined above and $X^+$ is a cation, and (C) an aluminum compound of the formula (III):

$$AlR_{3-n}Y_n \qquad (III)$$

wherein R is a hydrocarbon group having 4 to 20 carbon atoms, Y is a halogen atom, an alkoxyl group, a trialkylsiloxy group, a di(trialkylsilyl)amino group or a trialkylsilyl group, and n is 0, 1 or 2, to produce a polymer having a molecular weight distribution (Mw/Mn) of 1 to 1.3.

In case of using the hafnium catalyst, the living polymerization temperature is from −20 to −100° C., preferably from −30 to −80° C., more preferably from −40 to −80° C. In case of using the zirconium catalyst, the living polymerization temperature is lower as compared with the hafnium catalyst and is usually from −60 to −100° C., preferably from −60 to −80° C.

The present inventors have also found, as a result of further investigation about the zirconium catalyst, that the living polymerization is can be carried out at a higher temperature when the zirconium catalyst is prepared by using the zirconium-contawning compound (A-2), the boron compound (B) and optionally the aluminum compound (C) together with a titanium-containing compound (D).

Thus, the present invention further provides a process for preparing olefinic living polymers which comprises polymerizing an olefinic monomer having 2 to 20 carbon atoms at a polymerization temperature of −20 to −100° C. in the presence of a catalyst comprising:

(A-2) a zirconium-containing compound having one or two cyclopentadienyl backbones, (B) a borane compound (B-1) of the formula (I):

$$B(Ph)_3 \qquad (I)$$

wherein Ph is a phenyl group which may be substituted, or a borate compound (B-2) of the formula (II):

$$B^-(Ph)_4 X^+ \qquad (II)$$

wherein Ph is as defined above and $X^+$ is a cation, (D) a titanium-containing compound, and optionally (C) an aluminum compound of the formula (III):

$$AlR_{3-n}Y_n \qquad (III)$$

wherein R is a hydrocarbon group having 4 to 20 carbon atoms, Y is a halogen atom, an alkoxyl group, a trialkylsiloxy group, a di(trialkylsilyl)amino group or a trialkylsilyl group, and n is 0, 1 or 2.

Preferably, the titanium-containing compound (D) is a titanium-containing compound having one cyclopentadienyl backbone.

The polymerization is carried out preferably at a temperature of −30 to −80° C., especially −40 to −60° C.

The polymerization catalyst according to the present invention is formed, for example, by mixing the respective components which constitute the catalyst in a predetermined ratio in a solvent at a temperature not higher than room temperature. The catalyst according to the present invention is applicable to homopolymerization of an olefin and copolymerization of at least two olefins, and can produce living polymers having a narrow molecular weight distribution.

BEST MODE FOR CARRYING OUT THE INVENTION

Figure 1:
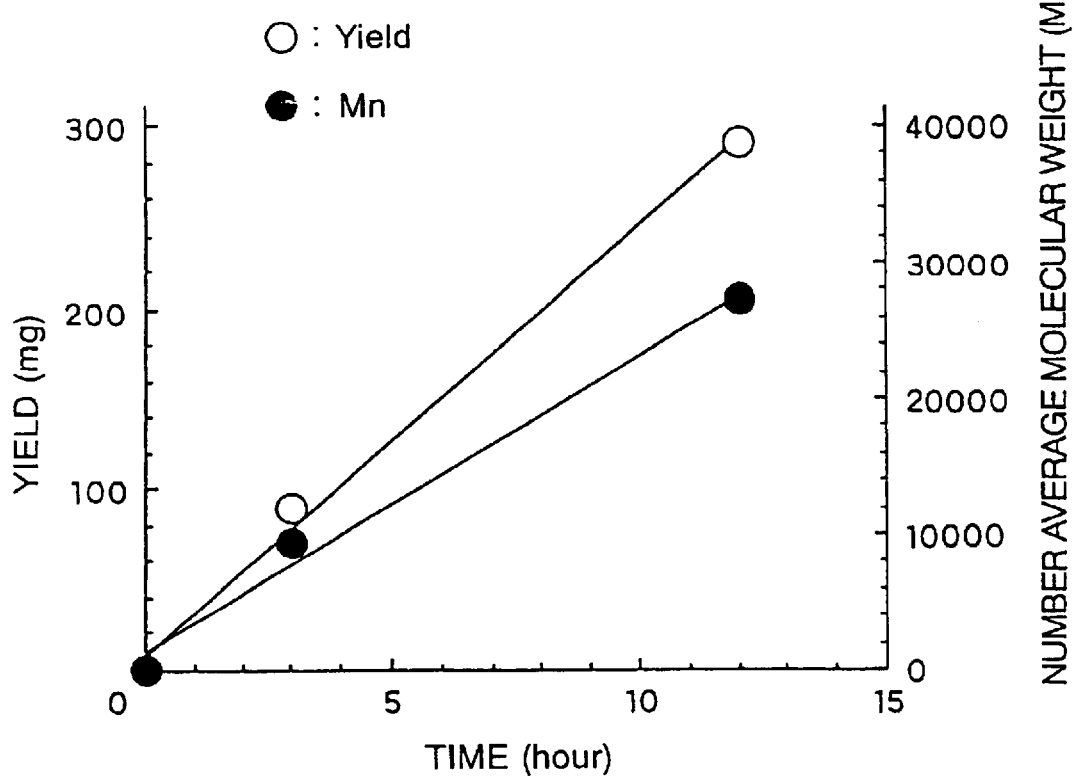
FIG. 1 is a graph showing the relationship between the reaction time and the yield and number average molecular weight of the living polymers prepared in Examples 1 and 2.

In the present invention, olefinic living polymers are prepared by polymerizing an olefinic monomer in the presence of a catalyst comprising:

(A) a hafnium-containing compound having one or two cyclopentadienyl backbones (A-1) or a zirconium-containing compound having one or two cyclopentadienyl backbones (A-2), (B) a borane compound (B-1) of the formula (I):

$$B(Ph)_3 \qquad (I)$$

wherein Ph is a phenyl group which may be substituted, or a borate compound (B-2) of the formula (II):

$$B^-(Ph)_4 X^+ \qquad (II)$$

wherein Ph is as defined above and $X^+$ is a cation, and optionally (C) an aluminum compound of the formula (III):

$$AlR_{3-n}Y_n \qquad (III)$$

wherein R is a hydrocarbon group having 4 to 20 carbon atoms, Y is a halogen atom, an alkoxyl group, a trialkylsiloxy group, a di(trialkylsilyl)amino group or a trialkylsilyl group, and n is 0, 1 or 2

As the olefinic monomer are used olefins having 2 to 20 carbon atoms, especially 2 to 10 carbon atoms, more especially 3 to 6 carbon atoms. α-Olefins are preferable.

Examples of the olefinic polymer are a linear α-olefin such as ethylene, propylene, 1-butene, 3-methyl-1-butene, 1-pentene, 3-methyl-1-pentene, 4-methyl-1-pentene, 3-ethyl-1-pentene, 4,4-dimethyl-1-pentene, 1-hexene, 4-methyl-1-hexene, 3-ethyl-1-hexene, 4-ethyl-1-hexene, 4,4-dimethyl-1-hexene, 1-octene, 1-decene, 1-dodecene, 1-tetradecene, 1-hexadecene, 1-octadecene or 1-eicocene; a linear diene such as 1,4-pentadiene, 1,4-hexadiene, 1,5-hexadiene, 1,7-octadiene, 1,8-nonadiene or 1,9-decadiene; a cyclic olefin or cyclic diene such as cyclopropene, cyclobutene, cyclopentene, cyclohexene, cycloheptene, cyclooctene, cyclodecene, cyclododecene, cyclotetradecene, cycloeicocene, 3-methylcyclopentene, 3-methylcyclohexene, vinylcyclohexane, 1,2-dihydrodicyclopentadiene, dicyclopentadiene, norbornene, 1-methylnorbornene, 5-methylnorbornene, 7-methylnorbornene, 5-ethylnorbornene, 5-propylnorbornene, 5-phenylnorbornene, 5-benzylnorbornene, 5-ethylidenenorbornene, 5-vinylnorbornene, norbornadiene, 5,6-dimethylnorbornene or 5,5,6-trimethylnorbornene, and the like. These may be used alone or in admixture thereof. In case of using a combination of two or more olefins, these monomers may be subjected to random polymerization or may be subjected to block copolymerization. Of the above-mentioned monomers, ethylene, propylene, butene, hexene, octene, cyclopentene and norbornene are preferred from the viewpoints that they are industrially easy to obtain and inexpensive. From the viewpoint of α-olefin, preferred are ethylene, propylene, butene, hexene and octene, especially propylene, butene and hexene.

The catalyst comprising component (A), component (B) and optionally component (C) can be easily prepared and is relatively stable, and it is useful as a catalyst for living polymerization of olefins having 2 to 20 carbon atoms, especially propylene. As the case may be, it is useful as a catalyst for stereospecific living polymerization.

Preferably, the hafnium-containing compound having one or two cyclopentadienyl backbones (A-1) and the zirconium-containing compound having one or two cyclopentadienyl backbones (A-2) (these may be hereinafter referred to as "Group IV-B compound") are compounds of the formula (IV):

$$CpM^1R^1R^2R^3 \quad (IV)$$

compounds of the formula (V):

$$Cp_2M^1R^1R^2 \quad (V)$$

compounds of the formula (VI):

$$(Cp\text{-}Ae\text{-}Cp)M^1R^1R^2 \quad (VI)$$

and their derivatives wherein M1 is Zr atom or Hf atom, Cp is a cyclopentadienyl backbone which may be substituted, $R^1$, $R^2$ and $R^3$ are is independently a σ-bonding ligans or a chelate-forming ligand, A is a covalently bonding bivalent group, and e is an integer of 1 to 3, provided that at least two of $R^1$, $R^2$ and $R^3$ can be joined to form a ring, and in formulas (V) and (VI) two Cp groups may be the same or different. These may be used alone or in admixture thereof. Of these, the compounds (V) and (VI) having two cyclopentadienyl backbones are preferable.

Examples of the cyclopentadienyl backbone which may be substituted are cyclopentadienyl group and substituted cyclopentadienyl groups, and besides them, are indenyl group, substituted indenyl groups, tetrahydroindenyl group, substituted tetrahydroindenyl group, fluorenyl, octahydrofluorenyl group, substituted fluorenyl group, and the like. Preferable substituents of the cyclopentadienyl backbone which may be substituted are hydrocarbon groups having 1 to 20 carbon atoms, e.g. alkyl groups.

Examples of the substituted cyclopentadienyl groups are, for instance, methylcyclopentadienyl group, ethylcyclopentadienyl group, isopropylcyclopentadienyl group, dimethylcyclopentadienyl group, trimethylcyclopentadienyl group, tetramethylcyclopentadienyl group, pentamethylcyclopentadienyl group, trimethylsilylcyclopentadienyl group, ethylmethylcyclopentadienyl group, tetraethylcyclopentadienyl group, propylcyclopentadienyl group, propylmethylcyclopentadienyl group, butylcyclopentadienyl group, butylmethylcyclopentadienyl group, t-butylcyclopentadienyl group, hexylcyclopentadienyl group, cyclohexylcyclopentadienyl group, cyclohexylmethylcyclopentadienyl group, benzylcyclopentadienyl group, diphenylcyclopentadienyl group, penta(trimethylsilyl)cyclopentadienyl group, trimethylgermylcyclopentadienyl group, trimethylstannylcyclopentadienyl group, trifluoromethylcyclopentadienyl group, and the like.

Examples of the σ-bonding ligand are hydrogen atom; a halogen atom such as fluorine atom, chlorine atom, bromine atom or iodine atom; a hydrocarbon group having 1 to 20 carbon atoms such as methyl group, ethyl group, n-propyl group, isopropyl group, n-butyl group, neopentyl group, cyclohexyl group, octyl group, 2-ethylhexyl group or norbornyl group; an alkoxyl group having 1 to 20 carbon atoms such as methoxy group, ethoxy group, propoxy group, isopropoxy group, butoxy group or phenoxy group; an aryl, alkylaryl or arylalkyl group having 6 to 20 carbon atoms such as phenyl group, tolyl group, xylyl group, benzyl group or diphenylmethyl group; allyl or substituted allyl group; a silicon-containing group such as trimethylsilyl group, phenyldimethylsilyl group, triphenylsilyl group, tri(dimethylsilyl)silyl group or (trimethylsilyl)methyl group; and the like. In case that the aluminum compound (C) mentioned after is not used, it is required to contain at least one of the above-mentioned groups selected from the hydrogen atom, the hydrocarbon groups having 1 to 20 carbon atoms, the aryl, alkylaryl or arylalkyl group having 6 to 20 carbon atoms, the allyl group, the substituted allyl group and the silicon-containing group.

The chelate-forming ligands are acetylacetonato group, substituted acetylacetonato group and the like.

Also, the covalently bonding bivalent group A in the formula (VI) includes, for instance, methylene group, dimethylmethylne group, ethylene group, isopropylidene group, cyclobutylidene group, cyclopentylidene group, cyclohexylidene group, dimethylsilylene group, dimethylgermylene group, dimethylstnnylene group, phenyl(methyl)methylene group, phenyl(methyl)silylene group, diphenylmethylene group, diphenylsilylene group and the like. In case that e is for example 2, two Cp groups are bonded at two positions by two groups A. The groups A may be different.

In case that the bridged dicyclopentadienyl compounds represented by the formula (VI) have a $C_1$, $C_2$ or $C_3$ symmetry, living polymers having a high stereoregularity can be obtained.

Examples of the compound (IV) are, for instance, (cyclopentadienyl)trimethylzirconium, (cyclopentadienyl)triphenylzirconium, (cyclopentadienyl)tribenzylzirconium, (cyclopentadienyl)trichlorozirconium, (cyclopentadienyl)trimethoxyzirconium, (cyclopentadienyl)dimethyl(methoxy)zirconium, (cyclopentadienyl)methyldichlorozirconium, (methylcyclopentadienyl)trimethylzirconium, (methylcyclopentadienyl)triphenylzirconium, (methylcyclopentadienyl)tribenzylzirconium, (methylcyclopentadienyl)trichlorozirconium, (methylcyclopentadienyl)dimethyl(methoxy)zirconium, (dimethylcyclopentadienyl)trimethylzirconium, (trimethylcyclopentadienyl)trimethylozirconium, (trimethylsilylcyclopentadienyl)trimethylzirconium, (tetramethylcyclopentadienyl)trimethylzirconium, (pentamethylcyclopentadienyl)trimethylzirconium, (pentamethylcyclopentadienyl)triphenylzirconium, (pentamethylcyclopentadienyl)tribenzylzirconium, (pentamethylcyclopentadienyl)trichlorozirconium, (pentamethylcyclopentadienyl)trimethoxyzirconium, (pentamethylcyclopentadienyl)dimethyl(methoxy)zirconium, (cyclopentadienyl)triethylzirconium, (cyclopentadienyl)tripropylzirconium, (cyclopentadienyl)trineopentylzirconium, (cyclopentadienyl)tri(diphenylmethyl)zirconium, (cyclopentadienyl)dimethylhydridozirconium, (cyclopentadienyl)triethoxyzirconium, (cyclopentadienyl)triisopropoxyzirconium, (cyclopentadienyl)triphenoxyzirconium, (cyclopentadienyl)dimethylisopropoxyzirconium, (cyclopentadienyl)diphenylisopropoxylzirconium, (cyclopentadienyl)dimethoxychlorozirconium, (cyclopentadienyl)methoxydichlorozirconium, (cyclopentadienyl)diphenoxychlorozirconium, (cyclopentadienyl)phenoxydichlorozirconium, (cyclopentadienyl)tri(phenyldimethylsilyl)zirconium, (n-butylcyclopentadienyl)dimethyl-n-butoxyzirconium, (benzylcyclopentadienyl)di-m-tolylmethylzirconium, (trifluoromethylcyclopentadienyl)tribenzylzirconium, (diphenylcyclopentadienyl)dinorbornylmethylzirconium, (tetraethylcyclopentadienyl)tribenzylzirconium, (pentatrimethylsilylcyclopentadienyl)tribenzylzirconium, (pentamethylcyclopentadienyl)trineopentylzirconium, (pentamethylcyclopentadienyl)methyldichlorozirconium, (pentamethylcyclopentadienyl)triethoxyzirconium, (pentamethylcyclopentadienyl)triphenoxyzirconium, (pentamethylcyclopentadienyl)methoxydichlorozirconium, (pentamethylcyclopentadienyl)diphenoxychlorozirconium, (pentamethylcyclopentadienyl)

phenoxydichlorozirconium, (indenyl)trimethylzirconium, (indenyl)tribenzylzirconium, (indenyl)trichlorozirconium, (indenyl)trimethoxylzirconium, (indenyl)triethoxylzirconium, and the above-mentioned compounds wherein zirconium is replaced by hafnium, e.g. cyclopentadienyltrimethylhafnium. Of these, compounds having one ligand selected from cyclopentadienyl group, ethylcyclopentadienyl group, propylcyclopentadienyl group, butylcyclopentadienyl group, tetramethylcyclopentadienyl group, pentamethylcyclopentadienyl group, indenyl group, methylindenyl group, tetrahydroindenyl group and fluorenyl group and three ligands selected from chlorine atom and methyl group are preferred from the viewpoint of industrially easily availability.

Examples of the compound (V) are, for instance, bis(cyclopentadienyl)dimethylzirconium, bis(cyclopentadienyl)diphenylzirconium, bis(cyclopentadienyl)diethylzirconium, bis(cyclopentadienyl)dibenzylzirconium, bis(cyclopentadienyl)dimethoxyzirconium, bis(cyclopentadienyl)dichlorozirconium, bis(cyclopentadienyl)dihydridozirconium, bis(cyclopentadienyl)chlorohydridozirconium, bis(methylcyclopentadienyl)dimethylzirconium, bis(methylcyclopentadienyl)dibenzylzirconium, bis(methylcyclopentadienyl)dichlorozirconium, bis(pentamethylcyclopentadienyl)dimethylzirconium, bis(pentamethylcyclopentadienyl)dibenzylzirconium, bis(pentamethylcyclopentadienyl)dichlorozirconium, bis(pentamethylcyclopentadienyl)chloromethylzirconium, bis(pentamethylcyclopentadienyl)hydridomethylzirconium, (cyclopentadienyl)(pentamethylcyclopentadienyl)dimethylzirconium, bis(cyclopentadienyl)dineopentylzirconium, bis(cyclopentadienyl)di-m-tolylzirconium, bis(cyclopentadienyl)di-p-tolylzirconium, bis(cyclopentadienyl)bis(diphenylmethyl)zirconium, bis(cyclopentadienyl)dibromozirconium, bis(cyclopentadienyl)methylchlorozirconium, bis(cyclopentadienyl)ethylchlorozirconium, bis(cyclopentadienyl)cyclohexylchlorozirconium, bis(cyclopentadienyl)phenylchlorozirconium, bis(cyclopentadienyl)benzylchlorozirconium, bis(cyclopentadienyl)hydridomethylzirconium, bis(cyclopentadienyl)methoxylchlorozirconium, bis(cyclopentadienyl)ethoxylchlorozirconium, bis(cyclopentadienyl)(trimethylsilyl)methylzirconium, bis(cyclopentadienyl)bis(trimethylsilyl)zirconium, bis(cyclopentadienyl)(triphenylsilyl)methylzirconium, bis(cyclopentadienyl)(tris(dimethylsilyl)silyl)methylzirconium, bis(cyclopentadienyl)(trimethylsilyl)(trimethylsilylmethyl)zirconium, bis(methylcyclopentadienyl)diphenylzirconium, bis(ethylcyclopentadienyl)dimethylzirconium, bis(ethylcyclopentadienyl)dichlorozirconium, bis(propylcyclopentadienyl)dimethylzirconium, bis(propylcyclopentadienyl)dichlorozirconium, bis(n-butylcyclopentadienyl)dichlorozirconium, bis(t-butylcyclopentadienyl)bis(trimethylsilyl)zirconium, bis(hexylcyclopentadienyl)dichlorozirconium, bis(cyclohexylcyclopentadienyl)dimethylzirconium, bis(dimethylcyclopentadienyl)dimethylzirconium, bis(dimethylcyclopentadienyl)dichlorozirconium, bis(dimethylcyclopentadienyl)ethoxychlorozirconium, bis(ethylmethylcyclopentadienyl)dichlorozirconium, bis(propylmethylcyclopentadienyl)dichlorozirconium, bis(butylmethylcyclopentadienyl)dichlorozirconium, bis(trimethylcyclopentadienyl)dichlorozirconium, bis(tetramethylcyclopentadienyl)dichlorozirconium, bis(cyclohexylmethylcyclopentadienyl)dibenzylzirconium, bis(trimethylsilylcyclopentadienyl)dimethylzirconium, bis(trimethylsilylcyclopentadienyl)dichlorozirconium, bis(trimethylgermylcyclopentadienyl)dimethylzirconium, bis(trimethylgermylcyclopentadienyl)diphenylzirconium, bis(trimethylstannylcyclopentadienyl)dimethylzirconium, bis(trimethylstannylcyclopentadienyl)dibenzylzirconium, bis(trifluoromethylcyclopentadienyl)dimethylzirconium, bis(trifluoromethylcyclopentadienyl)dinorbornylzirconium, bis(indenyl)dibenzylzirconium, bis(indenyl)dichlorozirconium, bis(indenyl)dibromozirconium, bis(tetrahydroindenyl)dichlorozirconium, bis(fluorenyl)dichlorozirconium, (propylcyclopentadienyl)(cyclopentadienyl)dimethylzirconium, (cyclohexylcyclopentadienyl)(cyclopentadienyl)dibenzylzirconium, (pentatrimethylsilylcyclopentadienyl)(cyclopentadienyl)dimethylzirconium, (trifluoromethylcyclopentadienyl)(cyclopentadienyl)dimethylzirconium, and the above-mentioned compounds wherein zirconium is replaced by hafnium, e.g. bis(cyclopentadienyl)dimethylhafnium. Of these, compounds having two ligands selected from cyclopentadienyl group, ethylcyclopentadienyl group, propylcyclopentadienyl group, butylcyclopentadienyl group, tetramethylcyclopentadienyl group, pentamethylcyclopentadienyl group, indenyl group, methylindenyl group, tetrahydroindenyl group and fluorenyl group and two ligands selected from chlorine atom and methyl group are preferred from the viewpoint of industrially easy availability.

Examples of the compound (VI) are, for instance, ethylenebis(indenyl)dimethylzirconium, ethylenebis(indenyl)dichlorozirconium, ethylenebis(tetrahydroindenyl)dimethylzirconium, ethylenebis(tetrahydroindenyl)dichlorozirconium, dimethylsilylenebis(cyclopentadienyl)dimethylzirconium, dimethylsilylenebis(cyclopentadienyl)dichlorozirconium, isopropylidene(cyclopentadienyl)(9-fluorenyl)dimethylzirconium, isopropylidene(cyclopentadienyl)(9-fluorenyl)dichlorozirconium, [phenyl(methyl)methylene](9-fluorenyl)(cyclopentadienyl)dimethylzirconium, diphenylmethylene-(cyclopentadienyl)(9-fluorenyl)dimethylzirconium, ethylene(9-fluorenyl)(cyclopentadienyl)dimethylzirconium, cyclohexylidene(9-fluorenyl)(cyclopentadienyl)dimethylzirconium, cyclopentylidene(9-fluorenyl)(cyclopentadienyl)dimethylzirconium, cyclobutylidene(9-fluorenyl)(cyclopentadienyl)dimethylzirconium, dimethylsilylene(9-fluorenyl)(cyclopentadienyl)dimethylzirconium, dimethylsilylenebis(2,3,5-trimethylcyclopentadienyl)dimethylzirconium, dimethylsilylenebis(2,3,5-trimethylcyclopentadienyl)dichlorozirconium, dimethylsilylenebis(indenyl)dichlorozirconium, methylenebis(cyclopentadienyl)dimethylzirconium, methylenebis(cyclopentadienyl)di(trimethylsilyl)zirconium, methylene(cyclopentadienyl)(tetramethylcyclopentadienyl)dimethylzirconium, methylene(cyclopentadienyl)(fluorenyl)dimethylzirconium, ethylenebis(cyclopentadienyl)dimethylzirconium, ethylenebis(cyclopentadienyl)dibenzylzirconium, ethylenebis(cyclopentadienyl)dihydridozirconium, ethylenebis(indenyl)diphenylzirconium, ethylenebis(indenyl)methylchlorozirconium, ethylenebis(tetrahydroindenyl)dibenzylzirconium, isopropylidene(cyclopentadienyl)(methylcyclopentadienyl)dichlorozirconium, isopropylidene(cyclopentadienyl)(octahydrofluorenyl)dihydridozirconium, dimethylsilylenebis(cyclopentadienyl)dineopentylzirconium, dimethylsilylenebis (cyclopentadienyl)dihydridozirconium, dimethylsilylenebis(methylcyclopentadienyl)dichlorozirconium, dimethylsilylenebis(dimethylcyclopentadienyl)dichlorozirconium, dimethylsilylenebis(tetrahydroindenyl)dichlorozirconium, dimethylsilylene(cyclopentadienyl)(fluorenyl)dihydridozirconium, dimethylsilylene(methylcyclopentadienyl)(fluorenyl)dihydridozirconium, dimethylsilylenebis(3-trimethylsilylcyclopentadienyl)dihydridozirconium, dimethylsilylenebis(indenyl)dimethylzirconium, diphenylsilylenebis(indenyl)dichlorozirconium, phenylmethylsilylenebis(indenyl)dichlorozirconium, and the above-mentioned compounds wherein zirconium is replaced by hafnium. Those having $C_1$, $C_2$ or $C_3$ symmetry of these compounds can produce stereotactic living polymers. Compounds having two ligands selected from cyclopentadienyl group, ethylcyclopentadienyl group, propylcyclopentadienyl group, butylcyclopentadienyl group, tetramethylcyclopentadienyl group, pentamethylcyclopentadienyl group, indenyl group, methylindenyl group, tetrahydroindenyl group and fluorenyl group and two ligands selected from chlorine atom and methyl group are preferred from the viewpoint of industrially easy availability.

In the component (B) which constitutes the catalyst used in the present invention, the borane compound (B-1) is a compound represented by the formula (I):

$$B(Ph)_3 \quad (I)$$

wherein Ph is a phenyl group which may be substituted, and the borate compound (B-2) is a compound represented by the formula (II):

$$B^-(Ph)_4 X^+ \quad (II)$$

wherein Ph is as defined above and $X^+$ is a cation. These compounds (B-1) and (B-2) may be used in combination thereof.

In formula (I), the phenyl group which may be substituted includes, for instance, phenyl group, substituted phenyl group wherein 1 to 5 hydrogen atoms are substituted by other groups, e.g., fluorine atom, an alkyl group having 1 to 20 carbon atoms and a fluorinated alkyl group having 1 to 20 carbon atoms, typically monofluorophenyl group, difluorophenyl group, trifluorophenyl group, tetrafluorophenyl group, pentafluorophenyl group, fluoromethylphenyl group, di(trifluoromethyl)phenyl group, tolyl group, dimethylphenyl group, and the like. Of these, substituted phenyl group wherein 1 to 5 hydrogen atoms are substituted by fluorine atoms, particularly substituted phenyl group wherein 5 hydrogen atoms are all substituted by fluorine atoms, are preferred from the viewpoint of industrially easy availability.

In formula (I), three phenyl groups which may be substituted may be the same or different. From the viewpoint of industrially easy availability, preferable are compounds wherein fluorine atoms included in the three groups is 3 or more, particularly 15, in total.

Examples of the borane compound (B-1) are, for instance, triphenylboron, tris(2-fluorophenyl)boron, tris(3-fluorophenyl)boron, tris(4-fluorophenyl)boron, tris(2,3-difluorophenyl)boron, tris(3,5-difluorophenyl)boron, tris(2,3,5-trifluorophenyl)boron, tris(2,3,4,6-fluorophenyl)boron, tris(pentafluorophenyl)boron, tris(4-fluoromethylphenyl)boron, tri(3,5-di(trifluoromethyl)phenyl)boron, tris(p-tolyl)boron, tris(o-tolyl)boron, tris(3,5-dimethylphenyl)boron, and the like. Of these, tris(pentafluorophenyl)boron is particularly preferred.

The phenyl group which may be substituted in formula (II) is the same as those in formula (I) and, therefore, the explanation therefor is omitted.

In formula (II), four phenyl groups which may be substituted may be the same or different. From the viewpoint of industrially easy availability, preferable are compounds wherein fluorine atoms included in the four groups is 4 or more, particularly 20, in total.

The cation $X^+$ in formula (II) includes, for instance, triethylammonium, tri(n-butyl)ammonium, trimethylammonium, tetraethylammonium, methyltri(n-butyl)ammonium, benzyltri(n-butyl)ammonium, dimethyldiphenylammonium, methyltriphenylammonium, trimethylanilinium, methylpyridinium, methyl(2-cyanopyridinium), trimethylsulfonium, benzyldimethylsulfonium, triphenylammonium, tetrabutylammonium, methyldiphenylammonium, anilinium, methylanilinium, dimethylanilinium, dimethyl(m-nitroanilinium), dimethyl(p-bromoanilinium), pyridinium, p-cyanopyridinium, N-methylpyridinium, N-benzylpyridinium, o-cyano-N-methylpyridinium, p-cyano-N-methylpyridinium, p-cyano-N-benzylpyridinium, tetraphenylphosphonium, triphenylphosphonium, trityl, and the like.

Examples of the borate compound (B-2) represented by the formula (II) are, for instance, compounds having tetraphenylborate ion such as tetraphenylborate triethylammonium, tetraphenylborate tri(n-butyl)ammonium, tetraphenylborate trimethylammonium, tetraphenylborate tetraethylammonium, tetraphenylborate methyltri(n-butyl)ammonium, tetraphenylborate benzyltri(n-butyl)ammonium, tetraphenylborate dimethyldiphenylammonium, tetraphenylborate methyltriphenylammonium, tetraphenylborate trimethylanilinium, tetraphenylborate methylpyridinium, tetraphenylborate benzylpyridinium, tetraphenylborate methyl(2-cyanopyridinium), tetraphenylborate trimethylsulfonium, tetraphenylborate benzyldimethylsulfonium, and tetraphenylborate trityl; compounds having tetrakis(fluorine-containing phenyl)borate ion such as tetrakis(pentafluorophenyl)borate triethylammonium, tetrakis(pentafluorophenyl)borate tri(n-butyl)ammonium, tetrakis(pentafluorophenyl)borate triphenylammonium, tetrakis(pentafluorophenyl)borate tetrabutylammonium, tetrakis(pentafluorophenyl)borate tetraethylammonium, tetrakis(pentafluorophenyl) borate methyltri(n-butyl)ammonium, tetrakis(pentafluorophenyl)borate benzyltri(n-butyl)ammonium, tetrakis(pentafluorophenyl)borate methyldiphenylammonium, tetrakis(pentafluorophenyl)borate methyltriphenylammonium, tetrakis(pentafluorophenyl)borate flt dimethyldiphenylammonium, tetrakis(pentafluorophenyl)borate anilinium, tetrakis(pentafluorophenyl)borate methylanilinium, tetrakis(pentafluorophenyl)borate dimethylanilinium, tetrakis(pentafluorophenyl)borate trimethylanilinium, tetrakis(pentafluorophenyl)borate dimethyl(m-nitroanilinium), tetrakis(pentafluorophenyl)borate dimethyl(p-bromoanilinium), tetrakis(pentafluorophenyl)borate pyridinium, tetrakis(pentafluorophenyl)borate p-cyanopyridinium, tetrakis(pentafluorophenyl)borate N-methylpyridinium, tetrakis(pentafluorophenyl)borate -N-benzylpyridinium, tetrakis(pentafluorophenyl)borate o-cyano-N-methylpyridinium, tetrakis(pentafluorophenyl)borate p-cyano-N-methylpyridinium, tetrakis(pentafluorophenyl)borate p-cyano-N-benzylpyridinium, tetrakis(pentafluorophenyl)borate trimethylsulfonium, tetrakis(pentafluorophenyl)borate benzyldimethylsulfonium, tetrakis(pentafluorophenyl)borate tetraphenylphosphonium, tetrakis(pentafluorophenyl)borate trityl, and tetrakis(3,5-di(trifuloromethyl)phenyl)borate dimethylanilinium; and the like. Of these, tetrakis(pentafluorophenyl)borate trityl is particularly preferred.

In the preparation of the catalysts, an aluminum compound (C) of the formula (III):

$$AlR_{3-n}Y_n \qquad (III)$$

wherein R is a hydrocarbon group having 4 to 20 carbon atoms, Y is a halogen atom, an alkoxyl group, a trialkylsiloxy group, a di(trialkylsilyl)amino group or a trialkylsilyl group, and n is 0, 1 or 2, may be used together with the organic hafnium or zirconium compound (A) and the boron-containing compound (B). The aluminum compound (C) serves as so-called scavenger. Thus, the compound (C) is not C needed to use when no impurity is included in the system, but in general, living polymers can be obtained more stably by the use thereof as compared with no use.

The hydrocarbon groups R having 4 to 20 carbon atoms in formula (III) are, for instance, n-butyl group, isobutyl group, sec-butyl A group, t-butyl group, pentyl. group, hexyl group, isohexyl group, octyl group, 2-ethylhexyl group, decyl group, cyclohexyl group, cyclooctyl group, phenyl group and the like. Of these, alkyl groups having 4 to 8 carbon atoms are preferred from the viewpoint of being industrially easily available.

The number of groups R included in the formula (III) is from 1 to 3. When the number of carbon atoms of R is from 4 to 20, living polymers are easy to obtain because of being hard to undergo chain transfer. It is preferable that the number of groups R is three, in other words, n is zero, since polymers are hard to undergo chain transfer and it becomes easy to obtain living polymers. Further, it is preferable that three groups R are alkyl groups having 4 to 8 carbon atoms. In case that the number of groups R included in the formula (III) is two or more, these groups may be the same or different.

The number of groups Y is from 0 to 2. The group Y includes a halogen atom such as chlorine, bromine or iodine, an alkoxyl group having 1 to 20 carbon atoms such as methoxy group, ethoxy group or phenoxy group, a trialkylsiloxy group wherein the alkyl group has 1 to 20 carbon atoms, a di(trialkylsilyl)amino group wherein the alkyl group has 1 to 20 carbon atoms, a trialkylsilyl group wherein the alkyl group has 1 to 20 carbon atoms, and the like. In case that the number of groups Y included in the formula (III) is two, these groups may be the same or different.

Examples of the aluminum compound (C) are, for instance, a trialkyl aluminum such as tri(n-butyl) aluminum, triisobutyl aluminum, tri-sec-butyl aluminum, tri-t-butyl aluminum, tripentyl aluminum, triisopentyl aluminum, tri-neopentyl aluminum, tri(4-methylpentyl) aluminum, tri(3-methylpentyl) aluminum, trihexyl aluminum, triisohexyl aluminum, tri-n-octyl aluminum, tri-2-ethylhexyl aluminum or tridecyl aluminum; a tri(cycloalkyl) aluminum such as tricyclopentyl aluminum, tricyclohexyl aluminum or tricyclooctyl aluminum; a tri(atomatic) aluminum such as triphenyl aluminum, tri-p-tolyl aluminum, tri-m-tolyl aluminum, tri(p-ethylphenyl) aluminum or tribenzyl aluminum; a dialkyl aluminum halide such as di-n-butyl aluminum chloride, diisobutyl aluminum chloride, di-t-butyl aluminum chloride or dioctyl aluminum iodide; a dialkyl aluminum alkoxide such as diisobutyl aluminum methoxide, diisobutyl aluminum ethoxide, dioctyl aluminum methoxide, dioctyl aluminum ethoxide or di-n-butyl aluminum phenoxide; an alkyl aluminum dihalide such as n-butyl aluminum dichloride, isobutyl aluminum dichloride or octyl aluminum dichloride; an alkyl aluminum sesquihalide such as n-butyl aluminum sesquichloride; diisobutyl aluminum trimethylsilyloxide $(iso-Bu)_2AlOSiMe_3$, diisobutyl aluminum triethylsilyloxide $(iso-Bu)_2AlOSiEt_3$, diisobutyl aluminum di(trimethylsilyl)amine $(iso-Bu)_2AlN(SiMe_3)_2$, diisobutyltrimethylsilylaluminum $(iso-Bu)_2AlSiMe_3$, and the like. Of these, trioctyl aluminum and triisobutyl aluminum are preferred from the viewpoints of being industrially easily available and inexpensive.

The zirconium catalyst can also be prepared from zirconium-containing compound (A-2), boron-containing compound (B), titanium-containing compound (D) and optionally aluminum compound (C). The thus prepared zirconium catalyst enables to carry out the living polymerization of olefinic monomers at a higher temperature as compared with a zirconium catalyst prepared from the components (A-2) and (B) and optionally the component (C).

The titanium-containing compound (D) is a compound that to a titanium atom is combined at least one of groups, e.g., the cyclopentadienyl backbone, hydrogen atom, oxygen atom, halogen atom, alkyl group, substituted alkyl group, cycloalkyl group, aryl group, alkyl aryl group, arylalkyl group, allyl group, substituted allyl group, silicon atom-containing substituent such as trialkylsilyl group, germanium atom-containing substituent, phosphorus atom-containing substituent, alkoxyl group, aryloxy group, thiol group, arylthio group, amino group, alkylamino group, acetylacetonato group, substituted acetylacetonato group, acyloxy group and substituted sulfonato group. Two of these groups may be joined to each other. In particular, compounds containing halogen atom, alkoxyl group, alkylamino group, acetylacetonato group or substituted acetylacetonato group are preferred from the viewpoint of being industrially easily obtainable.

The titanium-containing compound (D) includes, for instance, organotitanium compounds containing no cyclopentadienyl backbone such as an alkyltitanium compound, an aryltitanium compound and an alkoxytitanium compound, and organotitanium compounds containing cyclopentadienyl backbone such as titanium compounds as represented by the formulas (IV), (V) and (VI) wherein $M^1$ is Ti.

Titanium compounds having one cyclopentadienyl backbone have a tendency that the yield and the molecular weight are increased, and are preferable as the titanium compound (D) from such a point of view.

Examples of the titanium compound (D) having no cyclopentadienyl backbone are, for instance, tetramethyltitanium, tetraneopentyltitanium, tetranorbornyltitanium, dinorbornyldimethyltitanium, tetrabenzyltitanium, tribenzylhydridotitanium, tetramethoxytitanium, tetraethoxytitanium, tetrabutoxytitanium, tetrachlorotitanium, tetrabromotitanium, butoxytrichlorotitanium, dimethoxydi(benzhydryl)titanium, butoxytris((trimethylsilyl)methyl)titanium, diphenoxybis(trimethylsilyl)titanium, (tri-t-butylsiloxy)trimethyltitanium, bis(2,5-di-t-butylphenoxy)dimethyltitanium, bis(2,5-di-t-butylphenoxy)dichlorotitanium, bis(2,6-diisopropyl-4-methylphenoxy)dibenzyltitanium, bis(2,4,6-trimethylphenoxy)dibenzyltitanium, titanium bis(acetylacetonato), titanium tetra(acetylaceitonato), 2,2'-thiobis(4-methyl-6-t-butylphenyl)dimethoxytitanium, 2,2'-thiobis(4-methyl-6-t-butylphenyl)

diisopropoxytitanium, tetrakis(dimethylamino)titanium, tetrakis(diethylamino)titanium, (Me$_2$N)$_2$TiCl$_2$, and the like. Examples of the titanium compound (D) having cyclopentadienyl backbone are, for instance, compounds exemplified for the compounds of the formulas (IV), (V) and (VI) provided that Zr is replaced by Ti; trivalent titanium compounds, e.g., biscyclopentadienylchlorotitanium, biscyclopentadienylmethyltitanium, bispentamethylcyclopentadienylchlorotitanium and bispentarnethylcyclopentadienylmethyltitanium; bridged titanium compounds having one cyclopentadienyl backbone, e.g., (dimethylsilyl)tetramethylcyclopentadienyl-t-butylamidodimethyltitanium, (dimethylsilyl)tetramethylcyclopentadienyl-t-butylamidodiethyltitanium, (dimethylsilyl)-t-butylcyclopentadienyl-t-butylamidodihydridotitanium, (dimethylsilyl)-t-butylcyclopentadienyl-t-butylamidodiphenyltitanium, (dimethylsilyl)trimethylsilylcyclopentadienyl-t-butylamidodihydridoitanium, (dimethylsilyl)tetramethylcyclopentadienylphenylamidodimethyltitanium, (dimethylsilyl)tetramethylcyclopentadienylphenylamidoditolyltitanium, (methylphenylsilyl)tetramethylcyclopentadienyl-t-butylamidodihydridotitanium, (methylphenylsilyl)tetramethylcyclopentadienyl-t-butylamidodimethyltitanium, (dimethylsilyl)fluorenylcyclohexylamidodimethyltitanium, (diphenylgermyl)indenyl-t-butylphosphidedihydridotitanium, (methylphenylsilyl)tetramethylcyclopentadienyl-t-butylamidodimethyltitanium, dimethylsilyl)tetramethylcyclopentadienyl-p-n-butylphenylamidodihydridotitanium, (dimethylsilyl)tetramethylcyclopentadienyl-p-n-butylphenylamido(trimethylsilyl)titanium, (ethylene)tetramethylcyclopentadienyl-t-butylamidodichlorotitanium, (ethylene)tetramethylcyclopentadienyl-t-butylamido(methylbenzyl)titanium, (ethylene)tetramethylcyclopentadienylmethylamidodichlorotitanium, (ethylene)tetramethylcyclopentadienylmethylamidodineopentyltitanium, (ethylene)tetramethylcyclopentadienylmethylamido(benzhydryl)titanium, (methylene)tetramethylcyclopentadienylethylamidodichlorotitanium, (methylene)tetramethylcyclopentadienylethylamidodiphenyltitanium, (dibenzylsilyl)tetramethylcyclopentadienyl-t-butylamidodibenzyltitanium, (dimethylsilyl)tetramethylcyclopentadienylbenzylamidodichlorotitanium, (dimethylsilyl)tetramethylcyclopentadienylbenzylamido(trimethylsilyl)titanium, (dimethylsilyl)tetramethylcyclopentadienylphenylphosphidodibenzyltitanium, [tBuNSiMe$_2$Flu]TiMe$_2$, and the like. Of these, from the viewpoint of industrial easy availability preferred are compounds having one ligand selected from cyclopentadienyl group, ethylcyclopentadienyl group, propylcyclopentadienyl group, butylcyclopentadienyl group, tetramethylcyclopentadienyl group, pentamethylcyclopentadienyl group, indenyl group, methylindenyl group, tetrahydroindenyl group and fluorenyl group together with 2 or 3 ligands selected from chlorine atom and methyl group.

The catalyst used in the process of the present invention can be obtained by mixing the organic hafnium or zirconium compound (A), the boron-containing compound (B) and optionally the organoaluminum compound (C) and/or the organotitanium compound (D) in a predetermined ratio and reacting them.

In case of using the organotitanium compound (D), it is preferable that at least one of the organozirconium compound (A-2) and the compound (D) is a compound containing an alkyl group (preferably methyl group), from the viewpoint that living polymers are easy to be obtained.

The obtained catalyst may be directly used as it is or may be used after separating and washing. It is preferable because of being simple and easy that the catalyst is prepared in a polymerization system and is used as it is.

In the preparation of the catalyst, from the viewpoint that the desired catalyst is efficiently obtained, it is preferable that the ratio of compound (A) to boron compound (B) (A/B ratio) is from 1/0.1 to 1/100 by mole, especially from 1/1 to 1/5 by mole. If the ratio is too large, the yield of the catalyst tends to decrease. If the ratio is too small, unnecessary use of the compound (B) is uneconomical.

Also, from the viewpoint that impurities present in the system are easy to be scavenged, it is preferable that the ratio of compound (A) to organoaluminum compound (C) (A/C ratio) is from 1/0 to 1/1000 by mole, especially from 1/10 to 1/500 by mole. If the ratio is too small, impurities present in the system are hard to be scavenged.

If the ratio is too large, it is hard to remove substances derived from the is compound (C) from polymers.

Further, it is preferable that the ratio of compound (A) to organotitanium compound (D) (A/D ratio) is from 1/0.5 to 1/1.5 by mole, especially from 1/0.75 to 1/1.25 by mole, since the compounds (A), (D) and (B) are easy to undergo an interaction in a ratio of 1:1:1, thus it becomes easy to carry out a living polymerization. When the A/D ratio is too small or too large, the compounds (A), (D) and (B) are hard to undergo an interaction in a ratio of 1:1:1.

It is preferable to react compound (A), compound (B) and optionally compound (C) and/or compound (D) in a solvent such as polymerization solvents mentioned after in an atmosphere of an inert gas at a temperature of from −100° C. to room temperature, especially from −100 to −20° C., since the shift from the reaction process to the polymerization process is easily effected. In general, mixing of these compounds forms a catalyst.

As preferable examples of the catalyst used in the present invention are mentioned those described in the working examples described after.

Olefinic living polymers having a molecular weight distribution (Mw/Mn) of 1 to 1.3, especially 1 to 1.2, can be prepared by polymerizing olefinic monomers in the presence of the thus prepared catalyst at a temperature of −20 to −100° C., especially −30 to −80° C., more especially −40 to −80° C., when the hafnium catalyst is used, and at a temperature of −60 to −100° C., especially −60 to −80° C., when the zirconium catalyst is used. If the temperature is too high, a chain transfer reaction is not negligible and living polymers are hard to be obtained. If the temperature is too low, the living polymerization rate tends to become slow.

In case of the zirconium catalyst comprising zirconium compound (A-2), boron compound (B), titanium compound (D) and optionally aluminum compound (C), it is possible to carry out the polymerization of olefinic monomers at a temperature of −20 to −100° C., preferably −30 to −80° C., more preferably −40 to −60° C.

As the amount of the catalyst, it is preferable that the molar ratio of olefinic monomer/catalyst (i.e. amount of either compound (A) or compound (B) which is used in a smaller amount than the other) is from 10 to $10^9$, especially 100 to $10^7$, more especially 1,000 to $10^5$. If the molar ratio is too small, polymers having a small molecular weight are only obtained, and if the molar ratio is too large, the yield of a polymer to a monomer tends to lower.

In case of using a polymerization solvent, the catalyst may be previously added to the polymerization solvent or may be added later to the polymerization system.

Examples of the polymerization solvent are, for instance, an aromatic hydrocarbon such as benzen, toluene, xylene or ethylbenzene; an alicyclic hydrocarbon such as cyclopentane, cyclohexane or methylcyclohexane; an aliphatic hydrocarbon such as pentane, hexane, heptane or octane; a halogenated hydrocarbon such as chloroform or dichloromethane; and the like. The solvents may be used alone or in admixture thereof. Also, monomers such as α-olefins, disubstituted olefins, trisubstituted olefins or tetrasubstituted olefins may be used as the solvent.

Other polymerization conditions are not particularly limited, and those skilled in the art can suitably select preferable conditions. In general, the polymerization time is from 10 minutes to 100 hours, and the reaction pressure is from atmospheric pressure to 100 kg/cm$^2$G.

Thus, olefinic living polymers having a number average molecular weight of 100 to 2,000,000, especially 500 to 2,000,000, more especially 1,000 to 1,000,000, the most especially 2,000 to 500,000, measured by GPC and a molecular weight distribution of not mote than 1.3, especially not more than 1.2, more especially not more than 1.1, are produced. The number average molecular weight and the molecular weight distribution herein denote values measured with respect to living polymers treated with HCl/methanol solution to detach the polymerization catalyst.

In general, when the molecular weight of produced polymers is within the range of 500 to 2,000,000, especially 1,000 to 1,000,000, more especially 2,000 to 500,000, the polymers do not precipitate during the polymerization. However, in case of homopolymerization of ethylene, propylene (at the time of stereospecific polymerization) and cyclic olefins, there is a case that the polymers are easy to crystallize. In that case, the polymers precipitate during the polymerization and the molecular weight distribution tends to broaden. Even in the case of polymers are easy to precipitate during the polymerization, if the molecular weight of produced polymers is not more than 3,000, especially not more than 2,000, more especially not more than 1,000, the most especially not more than 500, polymers are hard to precipitate and polymers having a relatively narrow molecular weight distribution are obtained. It is also preferable to copolymerize olefinic monomers with each other for the purpose of preventing crystallization and precipitation during the polymerization.

Evaluation of the prepared living polymers is made based on the fact that in general the yield and number average molecular weight (Mn) of polymers increase proportionally with increasing time and, moreover, the molecular weight distribution does not broaden. There are cases to which such an evaluation does not apply, e.g. a case that a mixture of polymers is obtained and a case that a polymer precipitates during the polymerization. In those cases, evaluation can be made, for example, in such a manner that the obtained bimodal GPC curve is replaced by two Gaussian curves to isolate the peaks.

The living polymers can be converted into so-called terminal-functionalized polymers that do not have a Group IV-B transition metal at the terminals by contacting with a reagent having an appropriate reactivity such as carbon monoxide. Also, in case of converting into block copolymers, block copolymers can be obtained in a high yield by contacting the living polymers with appropriate monomers of different kinds to carry out a multi-stage polymerization.

The process of the present invention is more specifically described and explained by means of examples and comparative examples, but it is to be understood that the present invention is not limited to these examples.

EXAMPLES 1 AND 2

To a dried 100 ml autoclave were added 14.4 ml of dry toluene and 0.8 mmole of tri(n-octyl)aluminum, and the autoclave was cooled to −78° C. Thereto were added 0.04 mmole of biscyclopentadienylzirconium dimethyl, 0.04 mmole of tris(pentafluorophenyl)boron and 83 mmoles of propylene, and the polymerization was carried out for 3 hours in Example 1 and for 12 hours in Example 2. The polymerization was then stopped by addition to 1,000 ml of HCl/methanol solution to precipitate a polymer. The polymer was obtained by filtering out the precipitate and drying under vacuum.

The yields of the polymer were 89 mg in Example 1 and 291 mg in Example 2. The number average molecular weights (Mn) measured by GPC and the molecular weight distributions (Mw/Mn) were 9,400 and 1.06 in Example 1 and 27,300 and 1.15 in Example 2.

Like this, polymers having a narrow molecular weight distribution were obtained.

The relationship between the time and the number average molecular weight and the relationship between the time and the yield are shown in FIG. 1.

From FIG. 1, it is found that the time and the number average molecular weight are in proportional. It is also found that the time and the yield are in proportional. Also from these results, it is understood that this polymerization is a living polymerization.

Comparative Example 1

To a dried 100 ml autoclave were added 14.4 ml of dry toluene and 0.8 mmole of tri(n-octyl)aluminum, and the autoclave was cooled to −50° C. Thereto were added 0.04 mmole of biscyclopentadienylzirconium dimethyl, 0.04 mmole of tris(pentafluorophenyl)boron and 83 mmoles of propylene, and the polymerization was carried out for 6 hours. The polymerization was then stopped by addition to 1,000 ml of HCl/methanol solution to precipitate a polymer. The polymer was. obtained by filtering out the precipitate and drying under vacuum.

The yield of the polymer was 1,110 mg. The polymer had a number average molecular weight (Mn) of 46,300 measured by GPC and a molecular weight distribution (Mw/Mn) of 1.55.

From the result that a polymer having such a broad molecular weight distribution was only obtained, it is understood that the polymerization does not always proceed in a living manner.

EXAMPLES 3 TO 5

To a dried 100 ml autoclave were added 14.4 ml of dry toluene and 0.8 mmole of tri(n-octyl)aluminum, and the autoclave was cooled to −50° C. Thereto were added 0.04 mmole of biscyclopentadienylhafnium dimethyl, 0.04 mmole of tris(pentafluorophenyl)boron and 83 mmoles of propylene, and the polymerization was carried out for 3 hours in Example 3, for 15 hours in Example 4 and for 24 hours in Example 5. The polymerization was then stopped by addition to 1,000 ml of HCl/methanol solution to precipitate a polymer. The polymer was obtained by filtering out the precipitate and drying under vacuum.

The yields of the polymer were 88 mg in Example 3, 460 mg in Example 4 and 650 mg in Example 5. The number average molecular weights (Mn) measured by GPC and the molecular weight distributions (Mw/Mn) were 6,000 and 1.08 in Example 3, 23,200 and 1.04 in Example 4 and 34,300 and 1.05 in Example 5.

Like this, polymers having a narrow molecular weight distribution were obtained.

Figure 2:
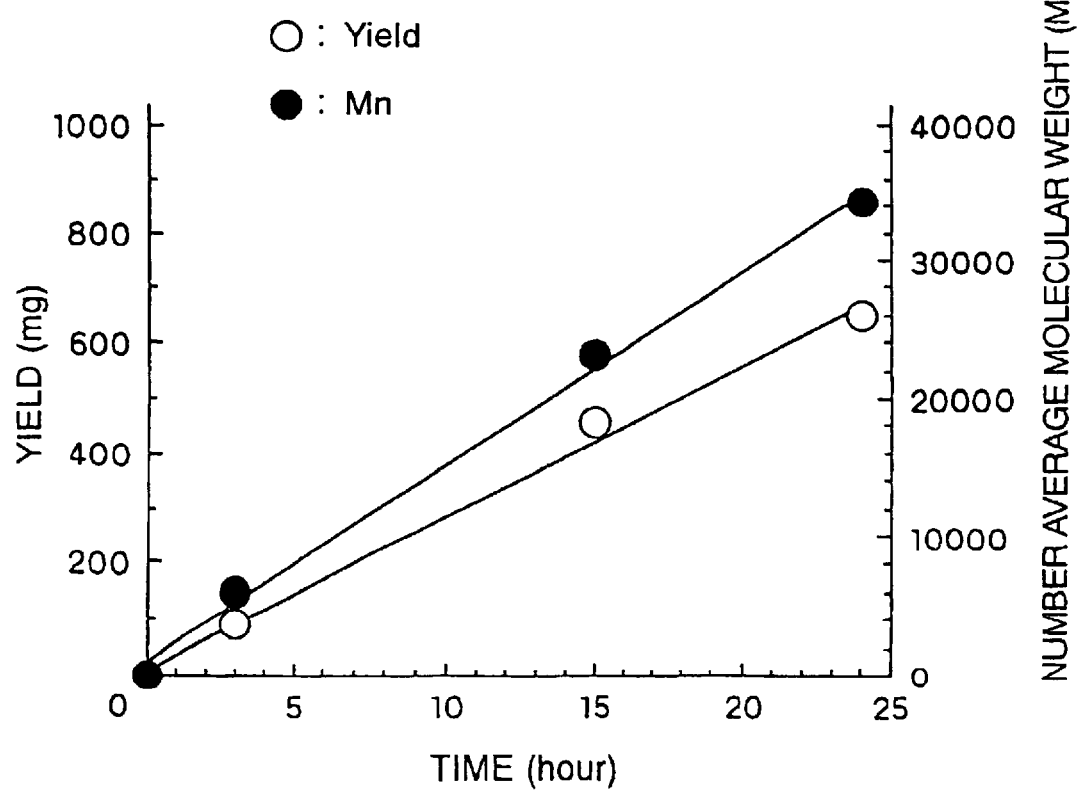
FIG. 2 is a graph showing the relationship between the reaction time and the yield and number average molecular weight of the living polymers prepared in Examples 3 to 5.

The relationship between the time and the number average molecular weight and the relationship between the time and the yield are shown in FIG. 2.

From FIG. 2, it is found that the time and the number average molecular weight are in proportional. It is also found that the time and the yield are in proportional. Also from these results, it is understood that this polymerization is a living polymerization.

EXAMPLES 6 AND 7

To a dried 100 ml autoclave were added 14.4 ml of dry toluene and 0.8 mmole of tri(n-octyl)aluminum, and the autoclave was cooled to −78° C. Thereto were added 0.04 mmole of biscyclopentadienylzirconium dichloride, 0.04 mmole of tris(pentafluorophenyl)boron and 83 mmoles of propylene, and the polymerization was carried out for 6 hours in Example 6 and for 12 hours in Example 7. The polymerization was then stopped by addition to 1,000 ml of HCl/methanol solution to precipitate a polymer. The polymer was obtained by filtering out the precipitate and drying under vacuum.

The yields of the polymer were 2.0 mg in Example 6 and 10 mg in Example 7. The polymer of Example 6 had a number average molecular weight (Mn) of 1,100 measured by GPC and a molecular weight distribution (Mw/Mn) of 1.20, and the polymer of Example 7 had a number average molecular weight (Mn) of 3,900 measured by GPC and a molecular weight distribution (Mw/Mn) of 1.23.

Like this, polymers having a narrow molecular weight distribution were obtained.

Figure 3:
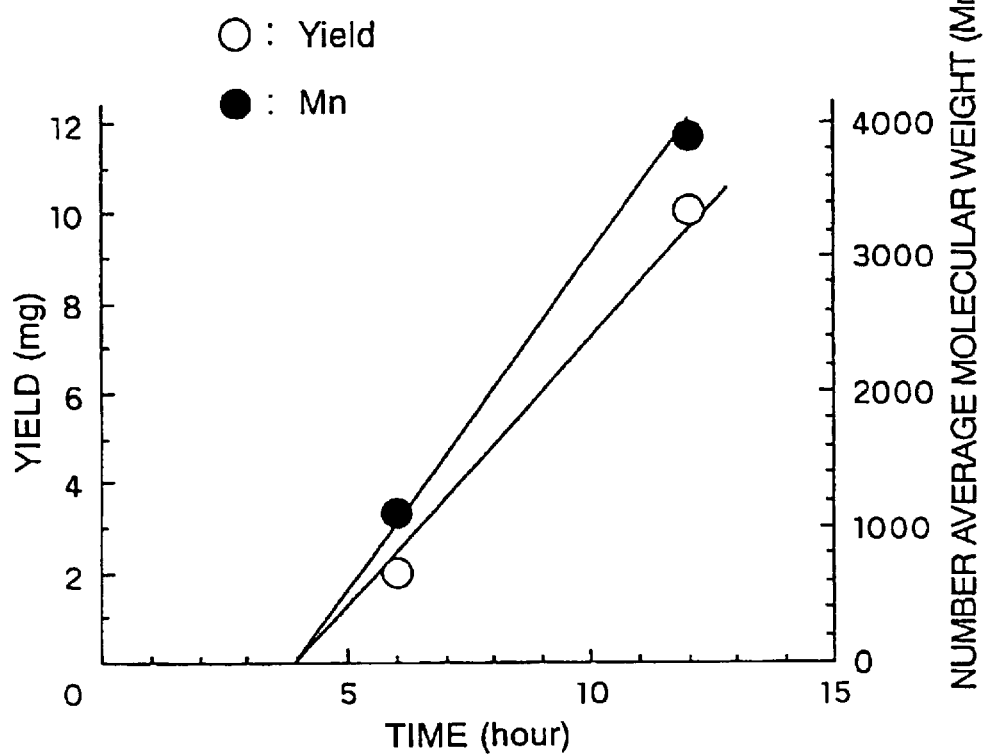
FIG. 3 is a graph showing the relationship between the reaction time and the yield and number average molecular weight of the living polymers prepared in Examples 6 and 7.

The relationship between the time and the number average molecular weight and the relationship between the time and the yield are shown in FIG. 3. From FIG. 3, it is found that the time and the number average molecular weight are in proportional although an induction period is present. It is also found that the time and the yield are in proportional. Also from these results, it is understood that this polymerization is a living like polymerization.

EXAMPLES 8 TO 10

To a dried 100 ml autoclave were added 11.0 ml of dry toluene and 0.8 mmole of tri(n-octyl)aluminum, and the autoclave was cooled to −78° C. Thereto were added 0.04 mmole of racethylenebisindenylzirconium dimethyl, 0.04 mmole of tris(pentafluorophenyl)boron and 83 mmoles of 1-hexene, and the polymerization was carried out for 5 hours in Example 8, for 12 hours in Example 9 and for 14 hours in Example 10. The polymerization was then stopped by addition to 1,000 ml of HCl/methanol solution to precipitate a polymer. The polymer was obtained by filtering out the precipitate and drying under vacuum.

The yields of the polymer were 10 mg in Example 8, 21 mg in Example 9 and 28 mg in Example 10. The number average molecular weights (Mn) measured by GPC and the molecular weight distributions (Mw/Mn) were 2,300 and 1.27 in Example 8, 4,300 and 1.22 in Example 9 and 5,400 and 1.29 in Example 10.

Like this, polymers having a narrow molecular weight distribution were obtained.

Figure 4:
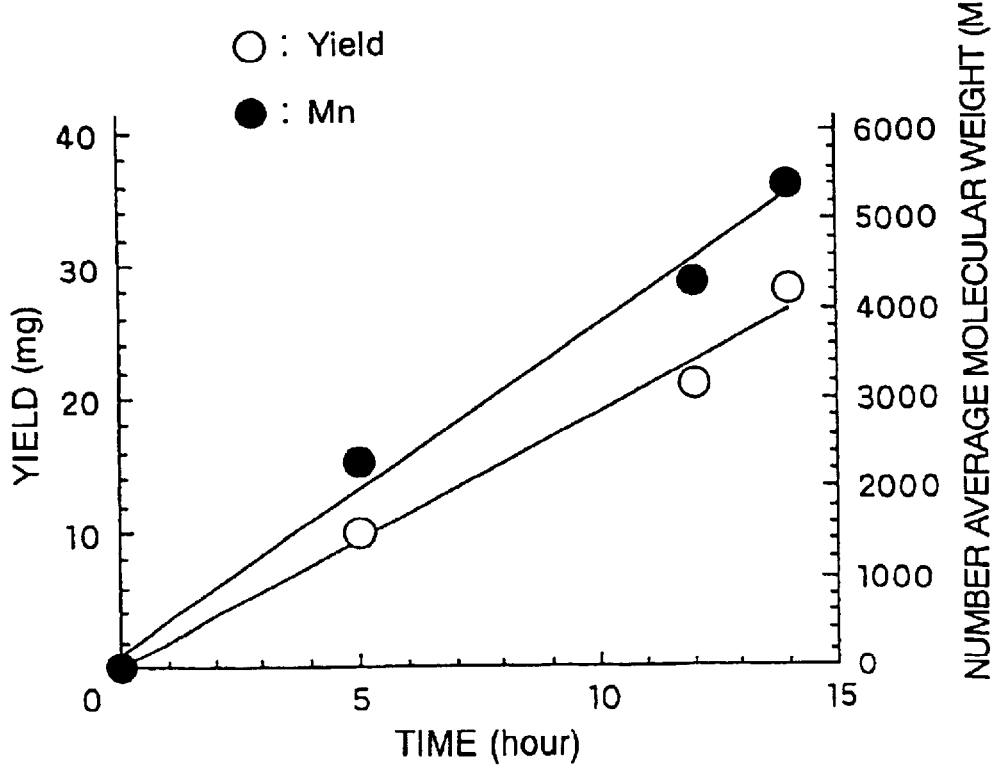
FIG. 4 is a graph showing the relationship between the reaction time and the yield and number average molecular weight of the living polymers prepared in Examples 8 to 10.

The relationship between the time and the number average molecular weight and the relationship between the time and the yield are shown in FIG. 4.

From FIG. 4, it is found that the time and the number average molecular weight are in proportional. It is also found that the time and the yield are in proportional. Also from these results, it is understood that this polymerization is a living polymerization.

Figure 5:
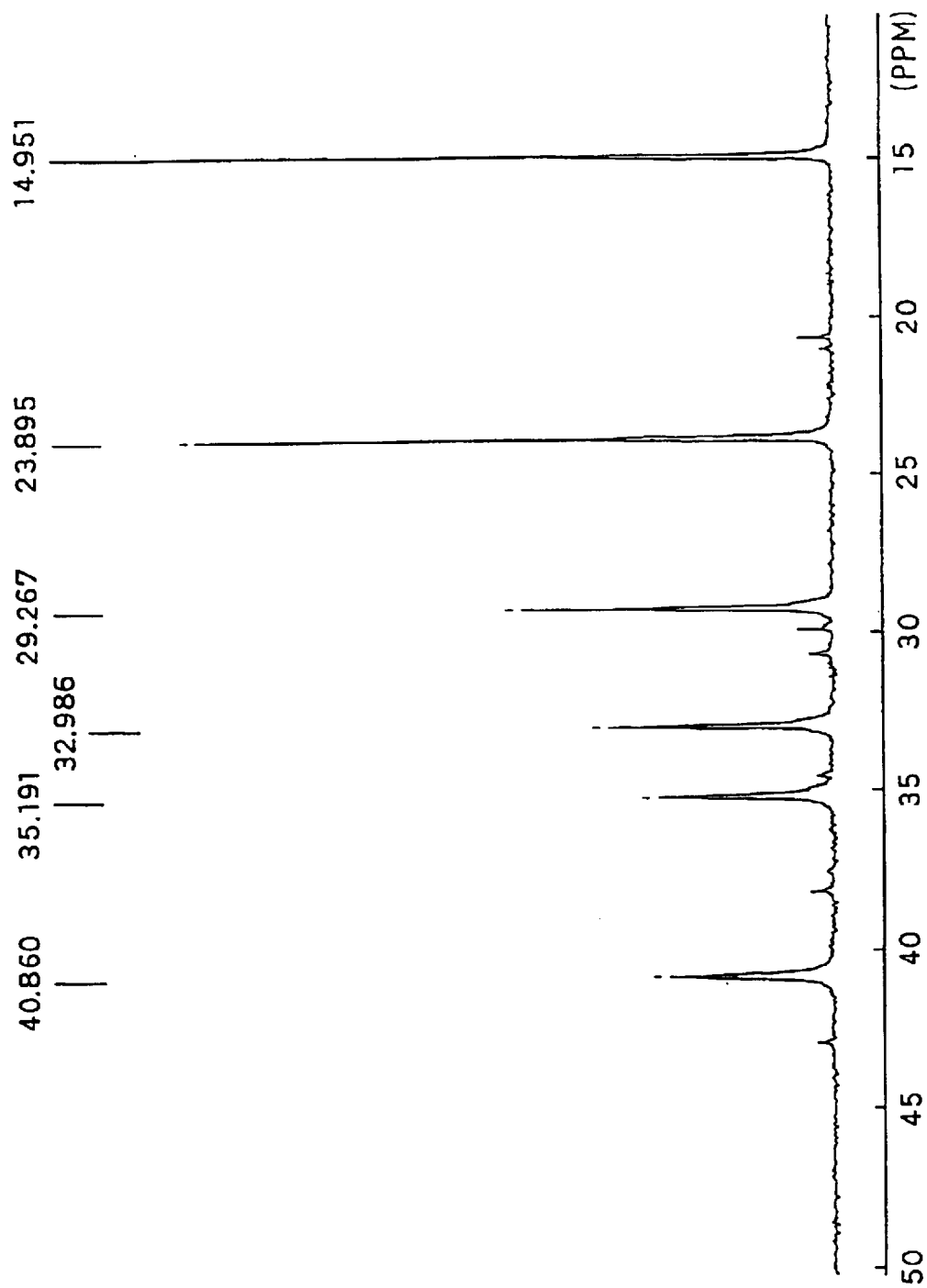
FIG. 5 is a view showing $^{13}$C-NMR signals of the polymer obtained in Example 10.

In FIG. 5 are also shown $^{13}$C-NMR signals of the polymer obtained in Example 10. As shown in FIG. 5, the signal of each carbon is approximately single and it is understood that the polymer has a high stereoregularity.

EXAMPLES 11 AND 12

To a dried 100 ml autoclave were added 14.4 ml of dry toluene and 0.8 mmole of tri(isobutyl)aluminum, and the autoclave was cooled to −78° C. Thereto were added 0.04 mmole of biscyclopentadienylzirconium dimethyl, 0.04 mmole of tris(pentafluorophenyl)boron and 83 mmoles of propylene, and the polymerization was carried out for 3 hours in Example 11 and for 12 hours in Example 12. The polymerization was then stopped by addition to 1,000 ml of HCl/methanol solution to precipitate a polymer. The polymer was obtained by filtering out the precipitate and drying under vacuum.

The yields of the polymer were 30 mg in Example 11 and 150 mg in Example 12. The polymer of Example 11 had a number average molecular weight (Mn) of 2,700 measured by GPC and a molecular weight distribution (Mw/Mn) of 1.23, and the polymer of Example 12 had a number average molecular weight (Mn) of 10,300 measured by GPC and a molecular weight distribution (Mw/Mn) of 1.04.

Like this, polymers having a narrow molecular weight distribution were obtained.

Figure 6:
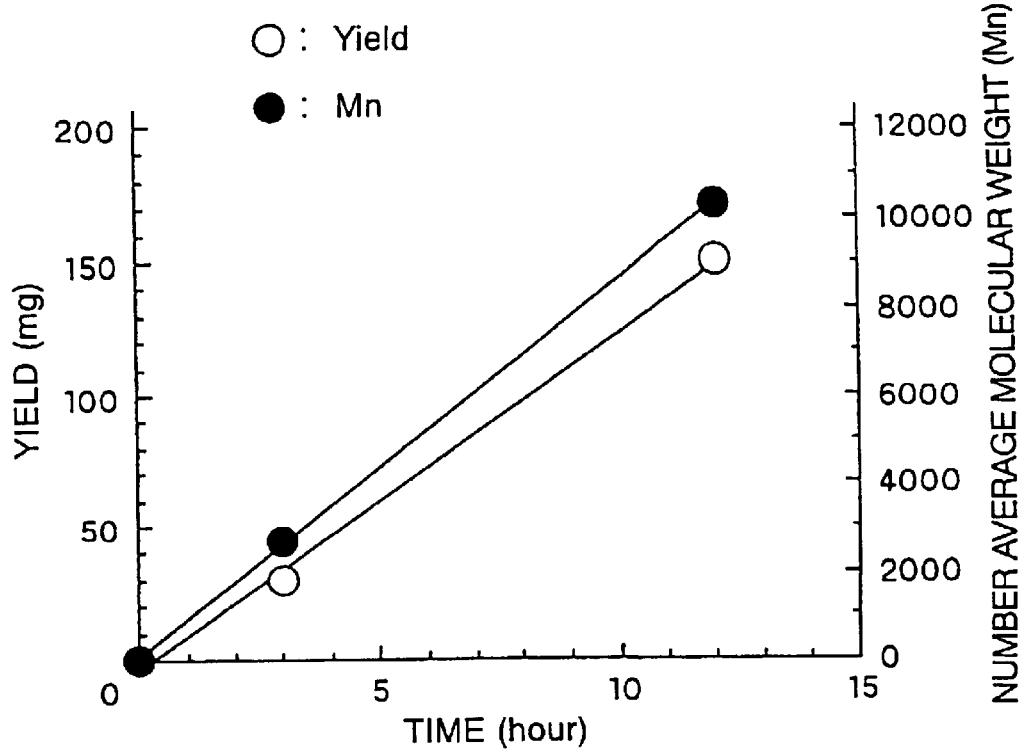
FIG. 6 is a graph showing the relationship between the reaction time and the yield and number average molecular weight of the living polymers prepared in Examples 11 and 12.

The relationship between the time and the number average molecular weight and the relationship between the time and the yield are shown in FIG. 6.

From FIG. 6, it is found that the time and the number average molecular weight are in proportional. It is also found that the time and the yield are in proportional. Also from these results, it is understood that this polymerization is a living polymerization.

EXAMPLES 13 AND 14

To a dried 100 ml autoclave were added 14.4 ml of dry toluene and 0.04 mmole of tris(pentafluorophenyl)boron, and the autoclave was cooled to −78° C. Thereto were added 0.04 mmole of biscyclopentadienylzirconium dimethyl and 83 mmoles of propylene, and the polymerization was carried out for 6 hours in Example 13 and for 24 hours in Example 14. The polymerization was then stopped by addition to 1,000 ml of HCl/methanol solution. The polymer was obtained by filtering out the precipitate and drying under vacuum.

The yields of the polymer were 24.0 mg in Example 13 and 110 mg in Example 14. The polymer of Example 13 had a number average molecular weight (Mn) of 1,900 measured by GPC and a molecular weight distribution (Mw/Mn) of 1.16, and the polymer of Example 14 had a number average molecular weight (Mn) of 9,200 measured by GPC and a molecular weight distribution (Mw/Mn) of 1.11.

Figure 7:
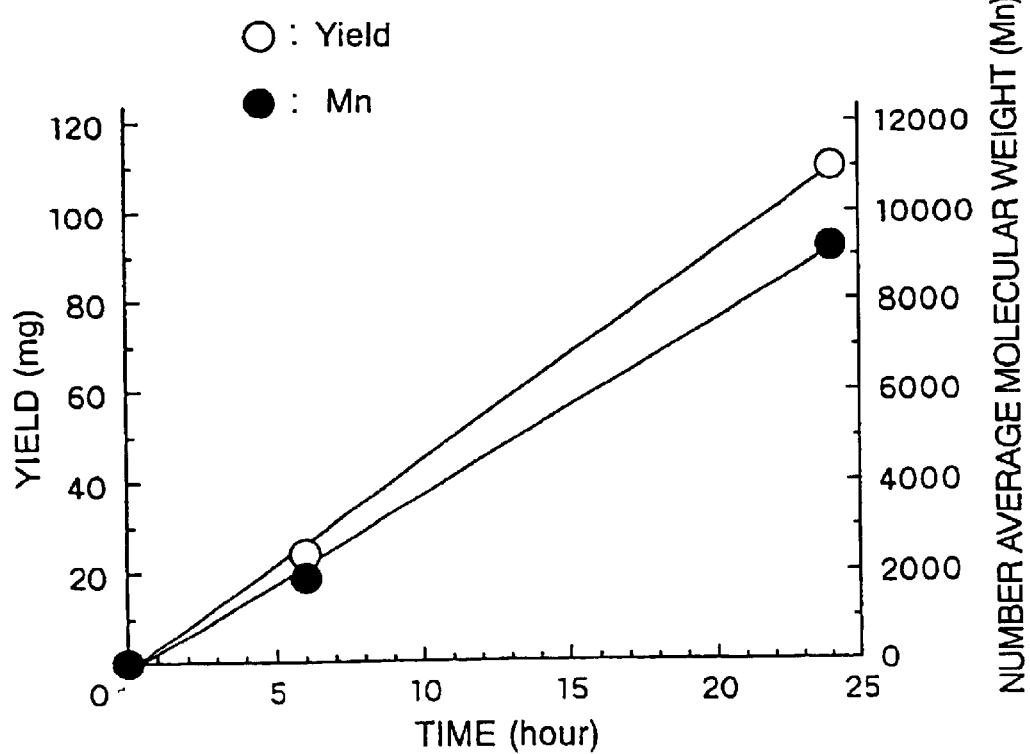
FIG. 7 is a graph showing the relationship between the isa reaction time and the yield and number average molecular weight of the living polymers prepared in Examples 13 and 14.

The relationship between the time and the number average is molecular weight and the relationship between the time and the yield are shown in FIG. 7.

From FIG. 7, it is found that the time and the number average molecular weight are in proportional. It is also found that the time and the yield are in proportional. Also from these results, it is understood that this polymerization is a living polymerization.

EXAMPLES 15 TO 17

To a dried 100 ml autoclave were added 9 ml of dry toluene, 7 ml of dry 2-methyl-1-pentene as a cosolvent and 0.8 mmole of tri(n-octyl)aluminum, and the autoclave was cooled to −50° C. Thereto were added 0.04 mmole of [tBuNSiMe$_2$Flu]TiMe$_2$, 0.04 mmole of tris(pentafluorophenyl)boron, 0.04 mmole of biscyclopentadienylzirconium hydride chloride and 83 mmoles of propylene, and the polymerization was carried out for 2 hours in Example 15, for 4 hours in Example 16 and for 9 hours in Example 17. The polymerization was then stopped by addition to 1,000 ml of HCl/methanol solution. The polymer was obtained by filtering out the precipitate and drying under vacuum.

The yields of the polymer were 13.3 mg in Example 15, 21.6 mg in Example 16 and 90.4 mg in Example 17. The GPC curves were bimodal. As a result of separating the peaks, the number average molecular weights (Mn) and the molecular weight distributions (Mw/Mn) were 5,900/1,300 and 1.12/1.14 in Example 15, 9,700/2,200 and 1.14/1.07 in Example 16, and 19,800/3,900 and 1.25/1.09 in Example 17.

According to $^{13}$C-NMR, the polymer of Example 17 was a polymer having a dyad of m/r=0.38/0.62. From the fact that a zirconium-derived polymer of Comparative Example 2 described after has a dyad of m/r=0.62/0.38 and a titanium-derived polymer of Comparative Example 4 described after has a dyad of m/r=0.24/0.76, the polymer of Example 17 was calculated to be a mixture of 37% of a zirconium-derived polymer and 63% of a titanium-derived polymer.

Also, from comparison of the Mn between Examples 15 to 17 and Comparative Examples of 2 to 4, it is found that the zirconium-derived polymer is a polymer with a higher molecular weight and the titanium-derived polymer is a polymer with a lower molecular weight.

Figure 8:
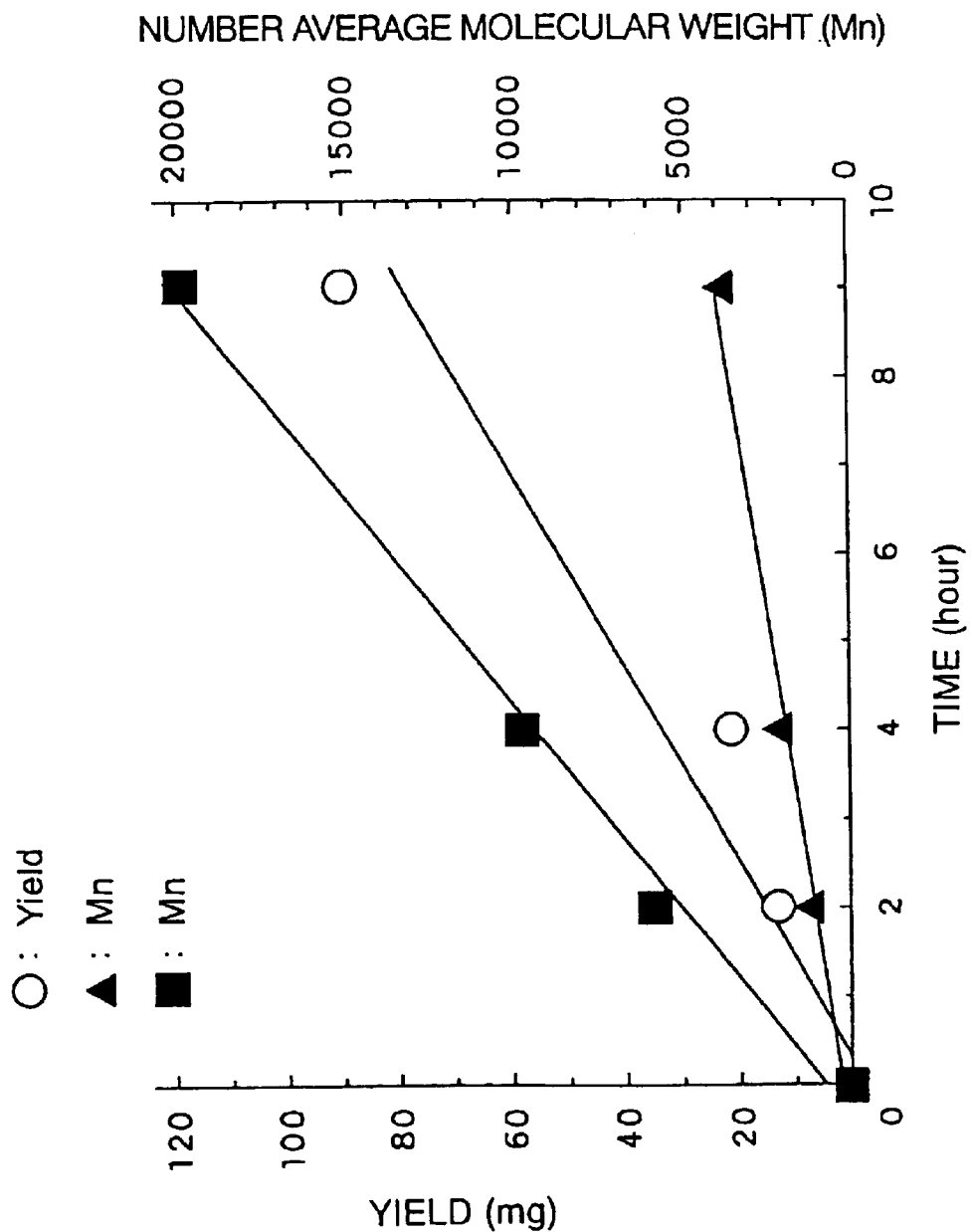
FIG. 8 is a graph showing the relationship between the reaction time and the yield and number average molecular weight of the living polymers prepared in Examples 15 to 17.

The number average molecular weight and the yield are plotted against the time in FIG. 8. In each case, both the number average molecular weight and the yield linearly increase against the time, and it is found therefrom that these polymers are living polymers.

Comparative Examples 2 and 3

To a dried 100 ml autoclave were added 9 ml of dry toluene, 7 ml of dry 2-methyl-1-pentene as a cosolvent and 0.8 mmole of tri(n-octyl)aluminum, and the autoclave was cooled to −50° C. Thereto were added 0.04 mmole of tris(pentafluorophenyl)boron, 0.04 mmole of biscyclopentadienylzirconium hydride chloride and 83 mmoles of propylene, and the polymerization was carried out for 4 hours in Comparative Example 2 and for 8 hours in Comparative Example 3. The polymerization was then stopped by addition to 1,000 ml of HCl/methanol solution. The polymer was obtained by filtering out the precipitate and drying under vacuum.

The yields of the polymer were 1,270 mg in Comparative Example 15 and 2,500 mg in Comparative Example 3.

The polymers were analyzed by GPC. The number average molecular weights (Mn) and the molecular weight distributions (Mw/Mn) were 248,000 and 1.73 in Comparative Example 2, and were 240,000 and 2.0 in Comparative Example 3.

The $^{13}$C-NMR showed that the polymer of Comparative Example 2 was a polymer rich in isotacticity (m/r=0.62/0.38).

Comparative Example 4

To a dried 100 ml autoclave were added 9 ml of dry toluene, 7 ml of dry 2-methyl-1-pentene as a cosolvent and 0.8 mmole of tri(n-octyl)aluminum, and the autoclave was cooled to −50° C. Thereto were added 0.04 mmole of [tBuNSiMe$_2$Flu]TiMe$_2$, 0.04 mmole of tris(pentafluorophenyl)boron and 83 mmoles of propylene, and the polymerization was carried out for 4 hours. The polymerization was then stopped by addition to 1,000 ml of HCl/methanol solution. The polymer was obtained by filtering out the precipitate and drying under vacuum.

The yield of the polymer was 14.3 mg.

The polymer was analyzed by GPC. The number average molecular weight (Mn) and the molecular weight distribution (Mw/Mn) were 2,200 and 1.15. It was already reported that under the above conditions living polymers were produced.

The $^{13}$C-NMR showed that the polymer was rich in syndiotacticity (m/r=0.24/0.76).

EXAMPLES 18 AND 19

To a dried 100 ml autoclave were added 9 ml of dry toluene, 7 ml of dry 2-methyl-1-pentene as a cosolvent and 0.8 mmole of tri(n-octyl)aluminum, and the autoclave was cooled to −50° C. Thereto were added 0.04 mmole of [tBuNSiMe$_2$Flu]TiMe$_2$, 0.04 mmole of tris(pentafluorophenyl)boron, 0.04 mmole of biscyclopentadienylzirconium dichloride and 83 mmoles of propylene, and the polymerization was carried out for 4 hours in Example 18 and for 12 hours in Example 19. The polymerization was then stopped by addition to 1,000 ml of HCl/methanol solution. The polymer was obtained by filtering out the precipitate and drying under vacuum.

The yields of the polymer were 62.3 mg in Example 18 and 187 mg in Example 19.

The GPC curves were monomodal. The polymer of Example 18 had a number average molecular weight (Mn) of 2,600 and a molecular weight distribution (Mw/Mn) of 1.28, and the polymer of Example 19 had a number average molecular weight (Mn) of 9,900 and a molecular weight distribution (Mw/Mn) of 1.30.

According to $^{13}$C-NMR, the polymer of Example 18 was a polymer having a dyad of m/r=0.555/0.445. The polymer of Example 18 was calculated to be a mixture of 83% of a zirconium-derived polymer and 27% of a titanium-derived polymer.

Figure 9:
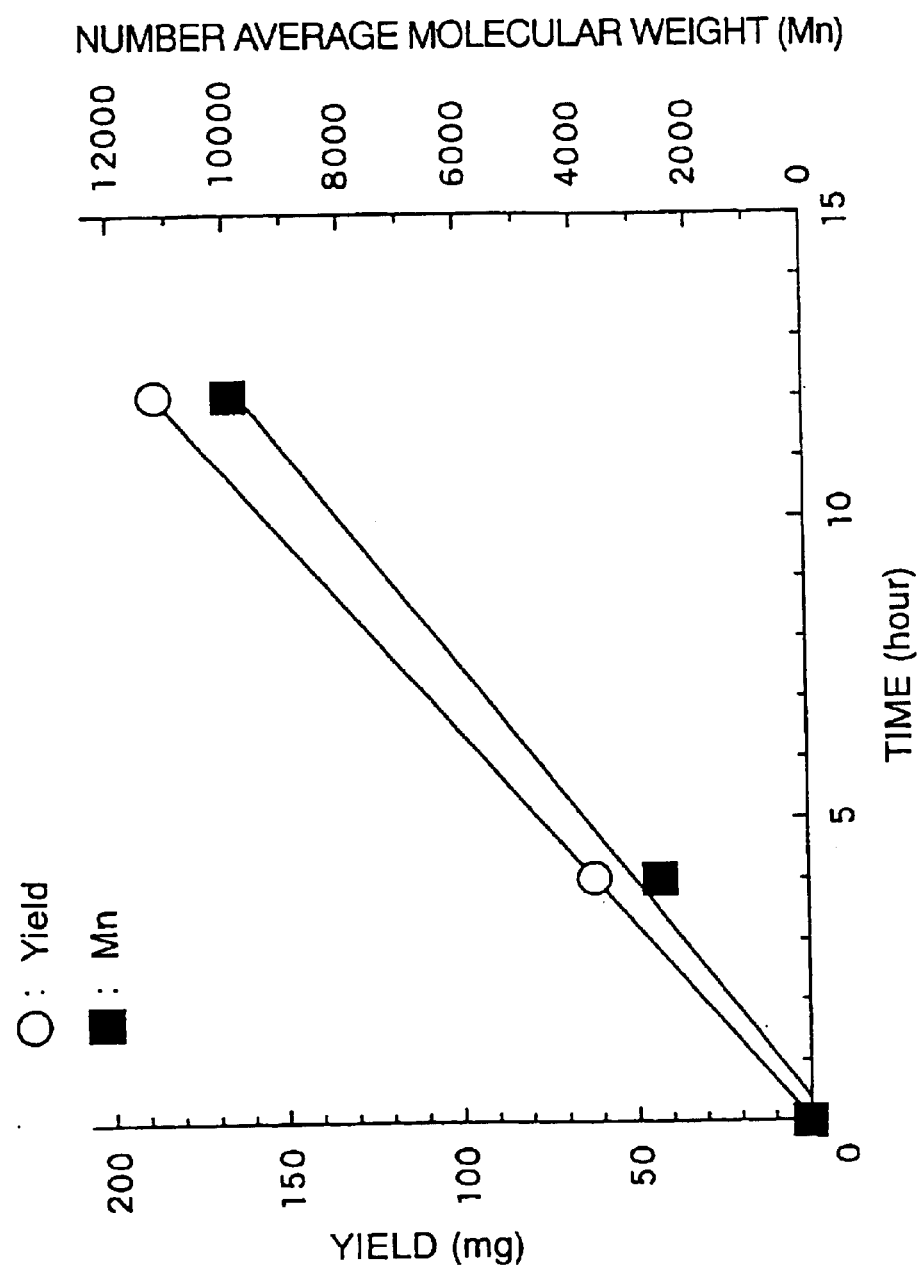
FIG. 9 is a graph showing the relationship between the reaction time and the yield and number average molecular weight of the living polymers prepared in Examples 18 and 19.

The number average molecular weight and the yield were plotted against the time in FIG. 9. Both the number average molecular weight and the yield linearly increase against the time, and it is found therefrom that these polymers are living polymers.

Comparative Examples 5 and 6

To a dried 100 ml autoclave were added 9 ml of dry toluene, 7 ml of dry 2-methyl-1-pentene as a cosolvent and 0.8 mmole of tri(n-octyl)aluminum, and the autoclave was cooled to −50° C. Thereto were added 0.04 mmole of tris(pentafluorophenyl)boron, 0.04 mmole of biscyclopentadienylzirconium dichloride and 83 mmoles of propylene, and the polymerization was carried out for 4 hours in Comparative Example 5 and for 8 hours in Comparative Example 6. The polymerization was then stopped by addition to 1,000 ml of HCl/methanol solution. The polymer was obtained by filtering out the precipitate and drying under vacuum.

The yields of the polymer were 3,290 mg in Comparative Example 5 and 3,300 mg in Comparative Example 6.

The polymers were analyzed by GPC. The polymer of Comparative Example 5 had a number average molecular weight (Mn) of 28,200 and a molecular weight distribution (Mw/Mn) of 1.87, and the polymer of Comparative Example 6 had a Mn of 28,000 and a Mw/Mn of 2.0.

EXAMPLES 20 AND 21

Polymers were prepared in the same manner as in Examples 18 and 19 except that biscyclopentadienylzirconium dimethyl was used instead of biscyclipentadienylzirconium dichloride.

The polymerization times were 4 hours and 7.5 hours, respectively. The yields were 193 mg and 434 mg, respectively. The Mn were 12,900 and 20,900, respectively. The Mw/Mn ratios were 1.51 and 1.41, respectively.

According to $^{13}$C-NMR, the polymer of Example 20 was a polymer having a dyad of m/r=0.58/0.42. The polymer of Example 20 was calculated to be a mixture of 90% of a zirconium-derived polymer and 10% of a titanium-derived polymer.

Figure 10:
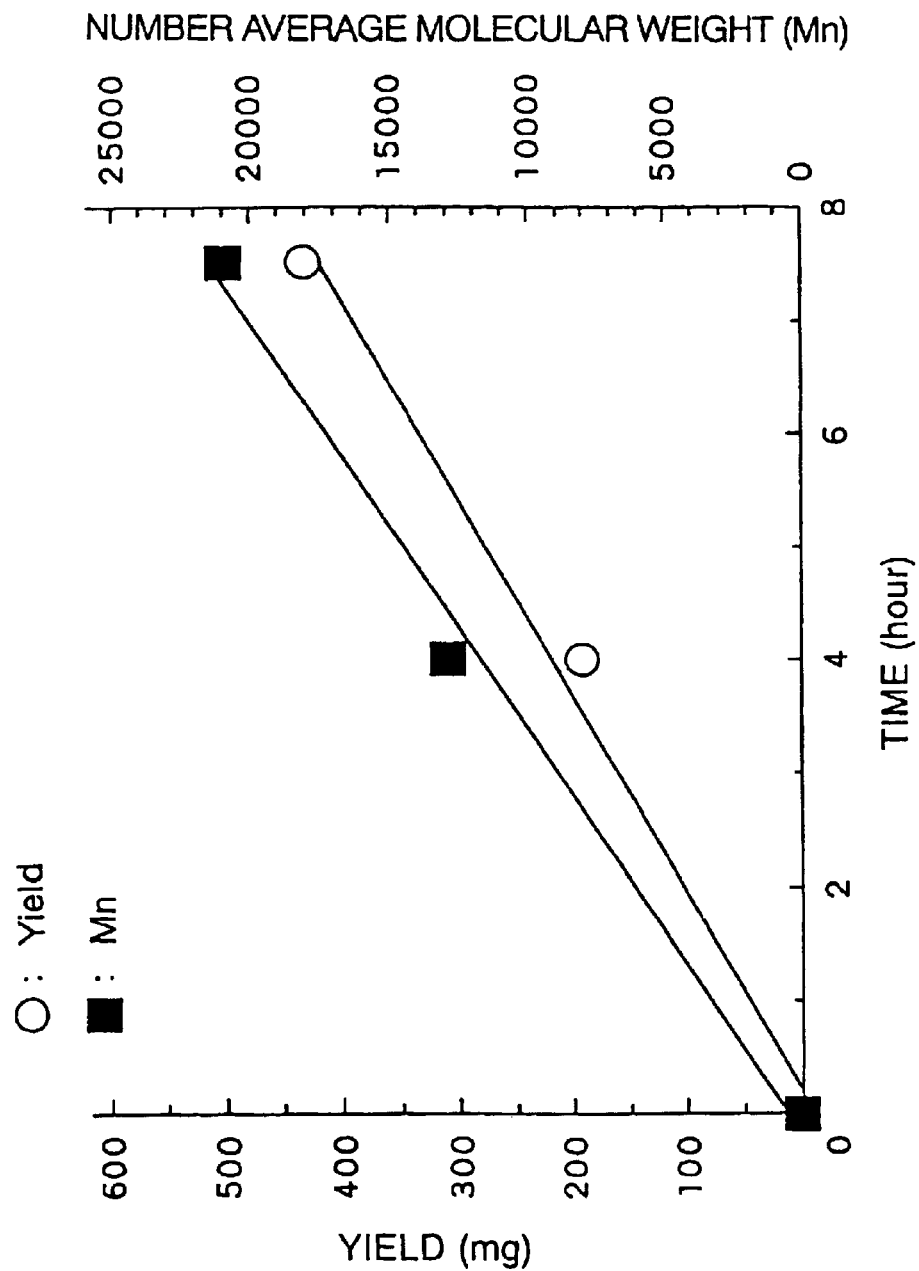
FIG. 10 is a graph showing the relationship between the reaction time and the yield and number average molecular weight of the living polymers prepared in Examples 20 and 21.

The number average molecular weight and the yield were plotted against the time in FIG. 10. Both the number average molecular weight and the yield linearly increase against the time, and it is found therefrom that these polymers are living polymers.

Comparative Examples 7 and 8

Polymers were prepared in the same manner as in Comparative Examples 5 and 6 except that biscyclopentadienylzirconium dimethyl was used instead of biscyclopentadienylzirconium dichloride.

The polymerization times were 4 hours and 78 hours, respectively. The yields were 273 mg and 422 mg, respectively. The Mn were 11,200 and 12,500, respectively. The Mw/Mn ratios were 1.55 and 1.69, respectively.

EXAMPLES 22 TO 24

To a dried 100 ml autoclave were added 9 ml of dry toluene, 7 ml of dry 2-methyl-1-pentene as a cosolvent and 0.8 mmole of tri(n-octyl)aluminum, and the autoclave was cooled to −50° C. Thereto were added 0.04 mmole of pentamethylcyclopentadienyl-titanium trichloride, 0.04 mmole of tris(pentafluorophenyl)boron, 0.04 mmole of biscyclopentadienylzirconium dimethyl and 83 mmoles of propylene. The polymerization was carried out for 7 hours in Example 22, for 15 hours in Example 23 and for 26 hours in Example 24. The polymerization was then stopped by addition to 1,000 ml of HCl/methanol solution. The polymer was obtained by filtering out the precipitate and drying under vacuum.

The yields of the polymer were 95.4 mg in Example 22, 273 mg in Example 23, and 526 mg in Example 24.

The polymers were analyzed by GPC. The polymer of Example 22 had a number average molecular weight (Mn) of 3,700 and a molecular weight distribution (Mw/Mn) of 1.29, the polymer of Example 23 had a Mn of 8,400 and a Mw/Mn of 1.38, and the polymer of Example 24 had a Mn of 17,600 and a Mw/Mn of 1.41.

Figure 11:
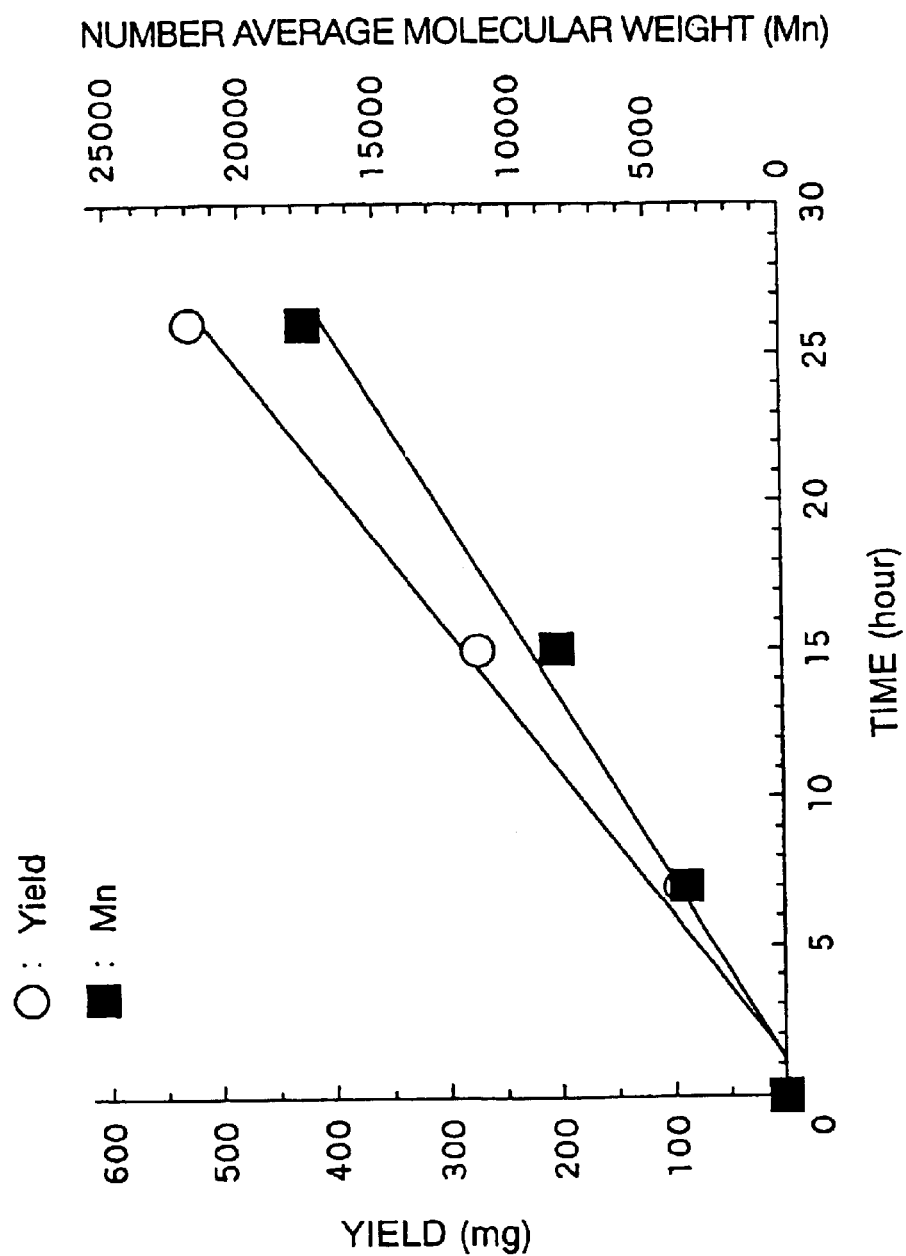
FIG. 11 is a graph showing the relationship between the reaction time and the yield and number average molecular weight of the living polymers prepared in Examples 22 to 24.

The number average molecular weight and the yield were plotted against the time in FIG. 11. Both the number average molecular weight and the yield linearly increase against the time, and it is found therefrom that these polymers are living polymers.

The molecular weight distribution (Mw/Mn ratio) is narrower than Comparative Examples 7, 8, 9 and 10, but is somewhat broader than Comparative Examples 1 and 3. The reason is assumed that like Examples 15 to 21, the product is a mixture of living polymers.

Comparative Examples 9 and 10

To a dried 100 mnl autoclave were added 9 ml of dry toluene, 7 ml of dry 2-methyl-1-pentene as a cosolvent and 0.8 mmole of tri(n-octyl)aluminum, and the autoclave was cooled to −50° C. Thereto were added 0.04 mmole of pentamethylcyclopentadienyl-titanium trichloride, 0.04 mmole of tris(pentafluorophenyl)boron and 83 mmoles of propylene. The polymerization was carried out for 6 hours in Comparative Example 9 and for 14 hours in Comparative Example 10. The polymerization was then stopped by addition to 1,000 ml of HCl/methanol solution. The polymer was obtained by filtering out the precipitate and drying under vacuum.

The yields of the polymer were 36.1 mg in Comparative Example 9 and 70.0 mg in Comparative Example 10.

The polymers were analyzed by GPC. The polymer of Comparative Example 9 had a number average molecular weight (Mn) of 3,400 and a molecular weight distribution (Mw/Mn) of 1.54, and the polymer of Comparative Example 10 had a Mn of 3,400 and a Mw/Mn of 2.04.

EXAMPLES 25 TO 27

To a dried 100 ml autoclave were added 9 ml of dry toluene, 7 ml of dry 2-methyl-1-pentene as a cosolvent and 0.8 mmole of tri(n-octyl)aluminum, and the autoclave was cooled to −50° C. Thereto were added 0.04 mmole of pentamethylcyclopentadienyl-titanium trimethyl, 0.04 mmole of tris(pentafluorophenyl)boron, 0.04 mmole of [(Ph$_2$C)CpFlu]ZrCl$_2$ and 83 mmoles of propylene. The polymerization was carried out for 6 hours in Example 25, for 12 hours in Example 26, and for 18 hours in Example 27. The polymerization was then stopped by addition to 1,000 ml of HCl/methanol solution. The polymer was obtained by filtering out the precipitate, fractionating a toluene-insoluble portion and drying it under vacuum. Since the polymer is insoluble in toluene, it is assumed that this polymer is a highly crystalline polymer derived by [(Ph$_2$C)CpFlu]ZrCl$_2$.

The yields of the polymer were 5.3 mg in Example 25, 8.0 mg in Example 26, and 11.1 mg in Example 27.

The polymers were analyzed by GPC. The polymer of Example 25 had a number average molecular weight (Mn) of 9,800 and a molecular weight distribution (Mw/Mn) of 1.37, the polymer of Example 26 had a Mn of 14,000 and a Mw/Mn of 1.53, and the polymer of Example 27 had a Mn of 17,100 and a Mw/Mn of 1.58. The reason that the molecular weight distribution is broad is assumed that the highly crystalline polymer precipitates during the polymerization and the system becomes heterogeneous.

Figure 12:
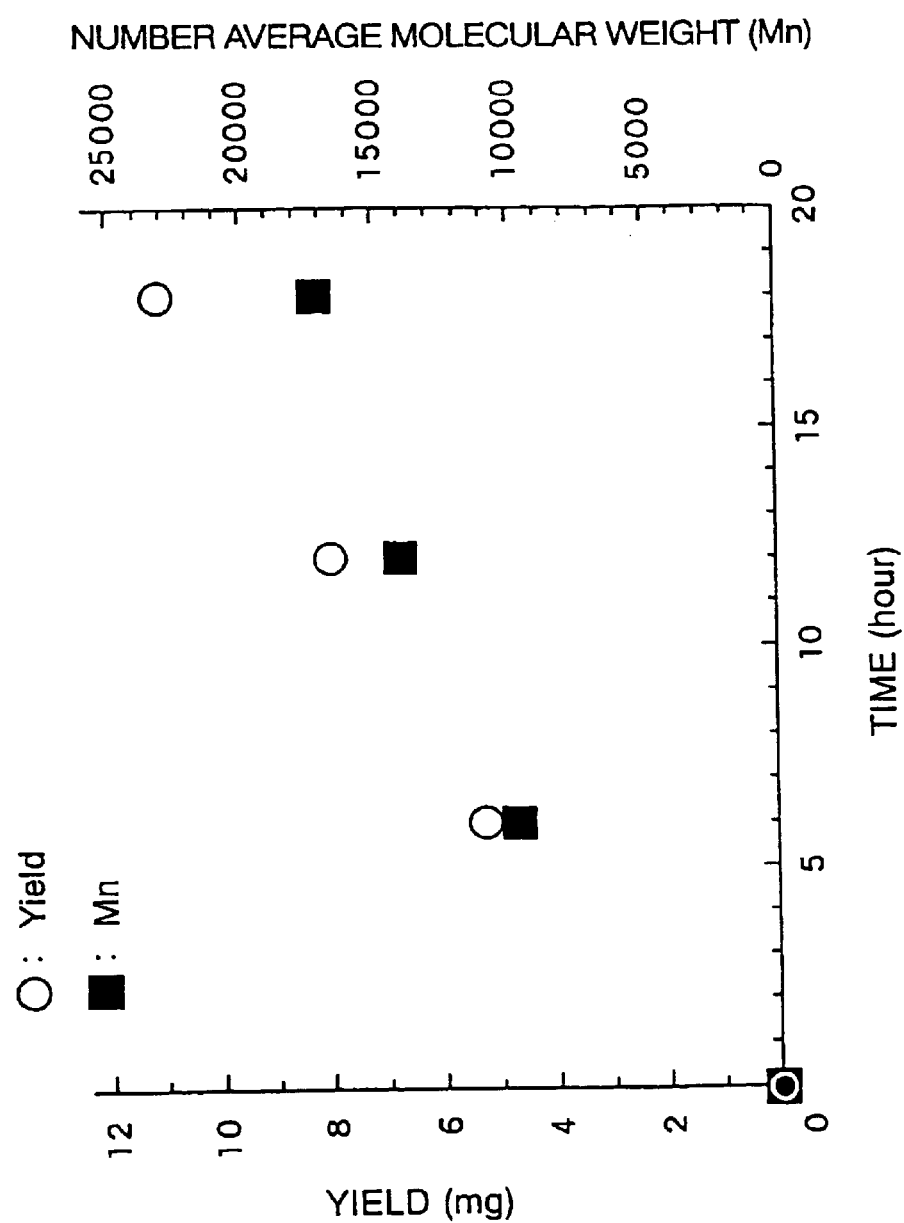
FIG. 12 is a graph showing the relationship between the reaction time and the yield and number average molecular weight of the living polymers prepared in Examples 25 to 27.

The number average molecular weight and the yield were plotted against the time in FIG. 12. Both the number average molecular weight and the yield increase against the time, and it is found therefrom that the zirconium-derived polymers are living polymers. The reason that the increase is not linear is assumed that the highly crystalline polymer precipitates during the polymerization and the system becomes heterogeneous.

Industrial Applicability

According to the present invention, the production of polymerization catalysts is easy, and living polymers of $C_2$ to $C_{20}$ olefin monomers having a molecular weight distribution (mw/mn ratio) of not more than 1.3 can be produced.

What is claimed is:

1. A process for preparing olefinic living polymers comprising polymerizing an olefinic monomer having 2 to 20 carbon atoms at a polymerization temperature of −20 to −1000° C. in the presence of a catalyst comprising:
   (A-1) a hafnium-containing compound having one or two cyclopentadienyl backbones,
   (B) a borane compound (B-1) of the formula (I):

$$B(Ph)_3 \qquad (I)$$

wherein Ph is a phenyl group which may be substituted and
   (C) an aluminum compound of the formula (III):

$$AlR_{3-n}Y_n \qquad (III)$$

wherein R is a hydrocarbon group having 4 to 20 carbon atoms, Y is a halogen atom, an alkoxyl group, a trialkylsiloxy group, a bis(trialkylsilyl)amino group or a trialkylsilyl group, and n is 0, 1 or 2, to produce a polymer having a molecular weight distribution (Mw/Mn) of 1 to 1.3.

2. The process of claim 1, wherein said polymerization temperature is from −30 to −80° C.

3. The process of claim 1, wherein said polymerization temperature is from −40 to −80° C.

4. A process for preparing olefinic living polymers comprising polymerizing an olefinic monomer having 2 to 20 carbon atoms at a polymerization temperature of −60 to −100° C. in the presence of a catalyst comprising:
   (A-2) a zirconium-containing compound having one or two cyclopentadienyl backbones,
   (B) a borane compound (B-1) of the formula (I):

$$B(Ph)_3 \qquad (I)$$

wherein Ph is a phenyl group which may be substituted, and
   (C) an aluminum compound of the formula (III):

$$AlR_{3-n}Y_n \qquad (III)$$

wherein R is a hydrocarbon group having 4 to 20 carbon atoms, Y is a halogen atom, an alkoxyl group, a trialkylsiloxy group, a bis(trialkylsilyl)amino group or a trialkylsilyl group, and n is 0, or 2, to produce a polymer having a molecular weight distribution (Mw/Mn) of 1 to 1.3.

5. The process of claim 4, wherein said polymerization temperature is from −60 to −80° C.

6. A process for preparing olefinic living polymers comprising polymerizing an olefinic monomer having 2 to 20 carbon atoms at a polymerization temperature of −20 to −100° C. in the presence of a catalyst comprising:
   (A-2) a zirconium-containing compound having one or two cyclopentadienyl backbones,
   (B) a borane compound (B-1) of the formula (I):

$$B(Ph)_3 \qquad (I)$$

wherein Ph is a phenyl group which may be substituted, or
   a borate compound (B-2) of the formula (II):

$$B^-(Ph)_4 X^+ \qquad (II)$$

wherein Ph is as defined above and $X^+$ is a cation, and
   (D) a titanium-containing compound.

7. A process for preparing olefinic living polymers comprising polymerizing an olefinic monomer having 2 to 20 carbon atoms at a polymerization temperature of −20 to −100° C. in the presence of a catalyst comprising:
   (A-2) a zirconium-containing compound having one or two cyclopentadienyl backbones,
   (B) a borane compound (B-1) of the formula (I):

$$B(Ph)_3 \qquad (I)$$

wherein Ph is a phenyl group which may be substituted, or
   a borate compound (B-2) of the formula (II):

$$B^-(Ph)_4 X^+ \qquad (II)$$

wherein Ph is as defined above and $X^+$ is a cation,
   (C) an aluminum compound of the formula (III):

$$AlR_{3-n}Y_n \qquad (III)$$

wherein R is a hydrocarbon group having 4 to 20 carbon atoms, Y is a halogen atom, an alkoxyl group, a trialkylsiloxy group, a bis(trialkylsilyl)amino group or a trialkylsilyl group, and n is 0, 1 or 2, and
   (D) a titanium-containing compound.

8. The process of claim 6 or 7 wherein said titanium-containing compound is a titanium-containing compound having one cyclopentadienyl backbone.

9. The process of claim 6 or 7, wherein at least one of said zirconium-containing compound having one or two cyclopentadienyl backbones (A-2) and said titanium-containing compound (D) contains an alkyl group.

10. The process of claim 6 or 7, wherein said polymerization temperature is from −30 to −80° C.

11. The process of claim 6 or 7, wherein said polymerization temperature is from −40 to −60° C.

12. The process of any of claims 1, 4, 6 and 7, wherein Ph group in said formula (I) or (II) is a group substituted by 1 to 5 fluorine atoms.

13. The process of any of claims 1, 4, 6 and 7, wherein Ph group in said formula (I) or (II) is a group substituted by five fluorine atoms.

14. The process of claim 1, 4, or 7, wherein n in said formula (III) is 0.

15. The process of claim 1, 4 or 7, wherein in said formula (III) n is 0 and R is an alkyl group having 4 to 8 carbon atoms.

16. The process of any of claims 1, 4, 6 and 7, wherein said olefinic monomer is an α-olefin having 2 to 20 carbon atoms.

17. The process of any of claims 1, 4, 6 and 7, wherein said olefinic monomer is an α-olefin having 2 to 10 carbon atoms.

18. The process of any of claims 1, 4, 6 and 7, wherein said olefinic monomer is an α-olefin olefin having 3 to 6 carbon atoms.

19. The process of any of claims 1, 4, 6 and 7, wherein said polymerizing is carried out under the condition that the produced polymer is not precipitated.

20. The process of any of claims 1, 4, 6 and 7, wherein said molecular weight distribution is from 1 to 1.2.

* * * * *